US012476805B2

(12) United States Patent
Golic

(10) Patent No.: US 12,476,805 B2
(45) Date of Patent: Nov. 18, 2025

(54) METHOD AND SYSTEM FOR DECRYPTION OF END-TO-END ENCRYPTED MESSAGES FOR LAWFUL INTERCEPTION

(71) Applicant: Telecom Italia S.p.A., Milan (IT)

(72) Inventor: Jovan Golic, Turin (IT)

(73) Assignee: Telecom Italia S.p.A., Milan (IT)

( * ) Notice: Subject to any disclaimer, the term of this patent is extended or adjusted under 35 U.S.C. 154(b) by 48 days.

(21) Appl. No.: 18/575,475

(22) PCT Filed: Jun. 29, 2022

(86) PCT No.: PCT/IB2022/056042
§ 371 (c)(1),
(2) Date: Dec. 29, 2023

(87) PCT Pub. No.: WO2023/275775
PCT Pub. Date: Jan. 5, 2023

(65) Prior Publication Data
US 2024/0323014 A1    Sep. 26, 2024

(30) Foreign Application Priority Data

Jul. 1, 2021   (IT) .................. 102021000017405

(51) Int. Cl.
*H04L 9/08*   (2006.01)
*H04L 9/40*   (2022.01)
*H04W 12/80*  (2021.01)

(52) U.S. Cl.
CPC .......... *H04L 9/0894* (2013.01); *H04L 9/0841* (2013.01); *H04L 9/085* (2013.01); *H04L 9/0869* (2013.01); *H04L 63/306* (2013.01); *H04W 12/80* (2021.01)

(58) Field of Classification Search
None
See application file for complete search history.

(56) References Cited

U.S. PATENT DOCUMENTS

| 8,850,203 | B2* | 9/2014 | Sundaram ............. | H04L 9/3073 380/282 |
|---|---|---|---|---|
| 2013/0182840 | A1* | 7/2013 | Buckley ............... | H04L 9/0861 380/44 |
| 2013/0236019 | A1* | 9/2013 | Zaverucha ............ | H04L 9/3263 380/278 |
| 2014/0059346 | A1* | 2/2014 | Campagna ............ | H04L 9/0894 713/168 |
| 2014/0093084 | A1* | 4/2014 | De Atley ................ | G06F 21/64 380/277 |
| 2015/0074396 | A1* | 3/2015 | Naslund .............. | H04L 63/0428 713/168 |
| 2015/0326302 | A1* | 11/2015 | Stojanovski ........ | H04W 12/033 370/315 |
| 2016/0323104 | A1* | 11/2016 | Mayers ............... | H04L 63/0407 |

(Continued)

OTHER PUBLICATIONS

Ghada et al., "How to (legally) keep secrets from mobile operators", International Association for Cryptologic Research, Mar. 29, 2021, pp. 1-23.

(Continued)

*Primary Examiner* — Michael Pyzocha
(74) *Attorney, Agent, or Firm* — XSENSUS LLP

(57) ABSTRACT

Method for decryption of end-to-end encrypted messages, wherein said messages are encrypted through user plane data encryption.

14 Claims, 6 Drawing Sheets

(56) References Cited

U.S. PATENT DOCUMENTS

2018/0375653 A1\* 12/2018 Setty ..................... H04L 9/3218
2020/0213839 A1\*  7/2020 Truchan ................ H04L 9/0869
2020/0314151 A1\* 10/2020 Schoinianakis ......... H04L 9/085

OTHER PUBLICATIONS

Nuñez et al., "Escrowed decryption protocols for lawful interception of encrypted data", IET Information Security, The Institution of Engineering and Technology, vol. 13, Issue 5, Apr. 29, 2019, pp. 498-507.

International Search Report and Written Opinion mailed on Sep. 27, 2022, received for PCT Application PCT/IB2022/056042, filed on Jun. 29, 2022, 10 pages.

\* cited by examiner

METHOD AND SYSTEM FOR DECRYPTION OF END-TO-END ENCRYPTED MESSAGES FOR LAWFUL INTERCEPTION

CROSS-REFERENCE TO RELATED APPLICATIONS

The present application is based on PCT filing PCT/IB2022/056042, filed Jun. 29, 2022, which claims priority from Italian Patent Application No. 102021000017405, filed Jul. 1, 2021, the entire contents of each are incorporated herein by reference.

BACKGROUND OF THE INVENTION

Field of the Invention

The present invention refers to a method and a system for decryption of encrypted messages.

More particularly, the invention refers to lawful interception and decryption of end-to-end communications between endpoint devices.

The present invention addresses an important practical problem of reconciling the legitimate needs of law enforcement agencies (LEAs) for lawful access to data in communication networks with the needs of the society (citizens, companies, organizations etc.) for protecting privacy and confidentiality of data by end-to-end (E2E) encryption. Lawful access to data includes lawful interception and data retention. In essence, the problem is how to enable access to plain data from given encrypted data if the underlying cryptographic decryption key is unknown to a law enforcement agency.

Without E2E encryption, lawful access is easy, but the data are then also exposed to unlawful access. This is clearly undesirable, especially in the next generation mobile networks (5G or beyond), due to the transmission and storage of large quantities of data generated by humans or machines and resulting from new applications enabled by high-throughput and low-latency communications and ubiquitous and dense connectivity involving an ever-increasing number of endpoint devices, e.g., in massive Internet of Things (mIoT) and machine-type communications.

In such a framework, there will be much more sensitive data (e.g., privacy-sensitive data or metadata, industrial secrets, and mission-critical data) to be protected. Moreover, the absence of E2E encryption enables (uncontrolled and global) mass surveillance in cyberspace by traffic monitoring in communication networks, which is generally considered to be in collision with fundamental human rights.

Overview of the Related Art

A known technique in the present technical field is key escrow, which enables authorized recovery of a session key via the recovery of a user master key. This is achieved by encrypting the session key at a sending endpoint device with an associated secret symmetric master key securely stored in the sending endpoint device, by sending out this encrypted session key together with an E2E encrypted message, and by holding the corresponding secret master key in escrow, to be made available to authorized LEAs under certain conditions. The storage of the escrowed secret master key is distributed, in terms of two key shares held in secure custody by two authorized government agencies as KEAs (Key Escrow Agents), so that the escrowed secret master key is recovered under a shared responsibility. This recovered master key is then used by a LEA for recovering the session key of a session initiated by the sending endpoint device. A major problem with this method is the lack of forward & backward secrecy, since once the secret master key of an endpoint device is recovered, it can then be used to decrypt all E2E encrypted sessions/messages initiated/originated by that endpoint device. Further, since the secret master key is symmetric and depends on the user, it is necessary to escrow the secret master keys of all the users, which may be insecure or impractical.

A key escrow method is proposed in S. Micali, "Fair public-key cryptosystems", Proc. Crypto '92, LNCS 740, pp. 113-38, 1993, while the related commercial key escrow system making use of this method is disclosed in more detail in U.S. Pat. No. 5,872,849. Specifically, U.S. Pat. No. 5,872,849 describes a cryptographic system and method with an asymmetric master key escrow feature that uses a verifiable splitting of users' private decryption master keys into shares and sending those shares to trusted KEAs chosen by particular users, and provides a system that uses public key certificates for the corresponding public encryption master keys and a trusted chip device for reconstructing the private decryption master keys from their shares received from the KEAs.

U.S. Pat. No. 6,026,163, describes a distributed split-key cryptosystem and application in a public-key setting wherein each of a plurality of trustees independently selects his own secret-public key pair. The trustees combine their public encryption keys into a single public encryption key, the latter being used to encrypt bids in an electronic auction.

Research paper J. Liu, M. D. Ryan, L. Chen, "Balancing societal security with individual privacy: Accountable escrow system", Proc. IEEE $27^{th}$ Computer Security Foundations Symposium, pp. 427-440, 2014, proposes a decryption escrow (rather than key escrow) system based on the Diffie-Hellman (ElGamal encryption) public-key cryptosystem. Decryption escrow enables message recovery without reconstructing any escrow decryption private key that would violate forward/backward secrecy. In the setup, each user and each DEA (Decryption Escrow Agent) generates its own public/private Diffie-Hellman key pair. The system has a trusted Certification Authority (CA) that cooperates with each user in the setup phase to compute, with appropriate randomization, an escrow public key associated with the user to be repeatedly used for the encryption of messages sent to the user. The ciphertext can be decrypted by the receiving user by using its Diffie-Hellman private key or, separately, by a cooperation of the DEAs by using their Diffie-Hellman private keys, i.e., E2E decryption is bound to escrow decryption.

Research paper D. Nuñez, I. Agudo, J. Lopez, "Escrow decryption protocols for lawful interception of encrypted data," IET Information Security, vol. 13, pp. 498-507, 2019 proposes another decryption escrow system that includes binding E2E decryption performed by the receiving user to escrow decryption performed by the LEA in cooperation with the DEAs. In the setup, the LEA generates its own public/private Diffie-Hellman key pair and each user generates two public/private Diffie-Hellman key pairs. By the interaction of each user and a CEA, an escrow public/private key of the user to be repeatedly used for the encryption/decryption of messages sent to that user is then generated. Also, for each DEA, a user-specific escrow decryption private key share is generated and sent to the DEA by the CA. The ciphertext sent to the receiving user can be decrypted by that user and, separately, by a cooperation of the LEA and the DEAs.

Moreover, there are proposals to use trusted middleboxes for lawful interception of E2E encrypted data. Middleboxes are trusted network devices that are authorized to intercept, inspect, and possibly modify or manipulate network traffic for various purposes, in accordance with specified read and/or write access to metadata or data (e.g., redirect or filter out network packets). Using trusted middleboxes for lawful interception of E2E encrypted data requires access to encryption session keys, which itself can be achieved by modifying the existing cryptographic protocols by violating the E2E encryption principle in order to allow for the intermediary functionality of trusted middleboxes. For example, in research paper D. Naylor, K. Schomp, M. Varvello, I. Leontiadis, J. Blackburn, D. Lopez, K. Papagiannaki, P. R. Rodriguez, and P. Steenkiste, "Multi-Context TLS (mcTLS): Enabling secure in-network functionality in TLS," Proc. SIGCOMM '15, London, pp. 199-212, 2015, the widely used TLS (Transport Layer Security) cryptographic protocol is proposed to be extended to accommodate trusted middleboxes.

SUMMARY OF THE INVENTION

The Applicant has observed that despite the efforts already done, there does not yet exist a satisfactory practical solution for reconciling the needs of law enforcement agencies (LEAs) for lawful access to data in communication networks with the needs of the society (citizens, companies, organizations etc.) for protecting privacy and confidentiality of data by end-to-end (E2E) encryption. The problem is essentially how to enable access to plain data from given encrypted data if the underlying cryptographic decryption key is unknown to a law enforcement agency.

In particular, the two proposals for decryption escrow made in research papers J. Liu, M. D. Ryan, L. Chen, "Balancing societal security with individual privacy: Accountable escrow system", Proc. IEEE 27$^{th}$ Computer Security Foundations Symposium, pp. 427-440, 2014 and D. Nuñez, I. Agudo, J. Lopez, "Escrow decryption protocols for lawful interception of encrypted data," IET Information Security, vol. 13, pp. 498-507, 2019, respectively, are not suitable as practical solutions for lawful interception because of a number of aspects, including a difficulty to adapt to mobile scenarios, where the LEA responsible for lawful interception depends on the current location of the target endpoint device, a fact that lawful interception works only for the incoming data traffic of a target endpoint device, and a need for trusted third parties, who can compromise the security. Also, the binding between E2E and escrow decryption is undesirable since it enables lawful interception of illegitimately collected network traffic data. Another undesirable property is that the encryption method in both the proposals is applied to messages instead of short session keys, which is computationally inefficient (e.g., to email messages at the application level).

The present invention deals with authorized session key recovery, as a legitimate method for lawful access to data. Session key recovery methods relevant for the present invention relate to the so-called escrow systems or, more precisely, to key escrow or decryption escrow systems.

In a session between two endpoint devices, instead of using a single bidirectional (symmetric) session key, two different unidirectional (symmetric) session keys can be used, one for each direction of communication. Similarly, a different unidirectional (symmetric) message key can be used for each message being communicated from one endpoint device to the other within a session. It is assumed herein that a single term "session key" covers all these cases, that a term "sending endpoint" is the endpoint that initiates a session, and that a term "receiving endpoint" relates to the first message in a session.

According to the present invention, an endpoint device initiating a session encrypts the session key by using an escrow encryption key. The session key is recovered in a shared framework by decrypting the encrypted session key by a cooperation of the LEA with a number of associated key escrow agents (KEAs) or decryption escrow agents (DEAs), under specified conditions and with appropriate authorizations. The LEA and KEAs or DEAs are equipped with private pieces of escrow decryption information enabling this decryption, which, together with said escrow encryption key, are generated in a setup phase of the lawful interception system according to the present invention. Preferably, LEA and KEAs or DEAs should be all independent of each other.

Specifically, the present invention refers to a system and method for session key recovery for E2E encryption of user plane data in mobile communication networks so as to enable a law enforcement agency to have lawful access to the user data. The system and method according to the present invention can be adapted to deal with the mobility of endpoint devices according to roaming scenarios where cross-border solutions are necessary. According to an embodiment of the present invention the generation of the session keys for E2E encryption is separated from the session key recovery. According to an embodiment of the present invention the authenticated session key establishment is based on long-term public/private key pairs associated with endpoint devices, where, preferably, the public keys are authenticated by a corresponding Mobile Network Operator (MNO). The type of (symmetric) E2E encryption algorithm can be negotiated during the establishment of the network connection and a preferred protocol is an ephemeral Diffie-Hellman key exchange protocol.

In a preferred embodiment, E2E encryption of user plane data is performed at a network layer, with endpoint device authentication managed by the MNOs responsible for the communication between the endpoint devices. The endpoint devices can be operated by humans or by computer programs as autonomous machines. As already described above, the session key recovery method is essentially of an escrow-type in which the session key is encrypted by an endpoint device initiating a session (or sending a message in a session) by using an escrow encryption key, possibly depending on sending and/or receiving endpoint device and/or the corresponding LEA. In a preferred embodiment, the session key encryption is activated by the corresponding MNO upon appropriate real-time authorization of the LEA (e.g., via a court order).

The encrypted session key is then associated with a corresponding E2E encrypted session as an attachment and sent out, preferably at the beginning of the session to the LEA by the corresponding MNO, together with E2E encrypted user plane data, to be decrypted by a cooperation of the LEA with a number of associated DEAs, which preferably verify the LEA's authorization for lawful interception before proceeding with decryption. The LEA and DEAs are equipped with private pieces of escrow decryption information enabling this decryption, which, together with said escrow encryption key, are generated in a setup phase of the lawful interception system according to the present invention. A successful session key recovery can be verified by using a data integrity mechanism such as a cryptographic checksum (e.g., a message authentication code) that is embedded in the encrypted user plane data. The checksum can be derived from the session key, endpoint device identifier(s), and the user plane data.

According to an embodiment of the present invention, the session key encryption is based on a randomized escrow public-key encryption of the session key, where the corresponding escrow decryption function is expressed in terms of a function that is homomorphic with respect to an escrow decryption private key, as will be explained later. This enables shared escrow decryption of the encrypted session key by the LEA and DEAs which individually perform partial escrow decryption functions on their private pieces of escrow decryption information, without recovering the escrow decryption private key. DEAs send their partial escrow decryption results to the LEA, which combines them with its own partial decryption result to recover the session key. A randomized escrow public-key encryption of the session key enables forward & backward secrecy, because a fresh random parameter which is generated for each new session requires partial escrow decryption functions to be performed for each new session. A successful session key recovery can be verified by using the data integrity mechanism described above and, in the case of negative verification, further sessions or network connections of the corresponding sending endpoint device can be disabled.

It should be noted that lawful interception with respect to an endpoint device is governed by the local regulation of a country where the endpoint device is located. Therefore, the escrow encryption enabling lawful interception of data traffic between two given endpoint devices can be activated only for the authorized LEAs in the respective countries where the two target endpoint devices are located. If the two target endpoint devices are located in the same country, then the authorized LEA is the same for both the devices, but if the countries are different, then the authorized LEAs are different. In the former case, escrow encryption should enable the session key recovery by only one LEA, whereas in the latter, it should enable the session key recovery by one or by both LEAs. In other words, in the latter case, lawful interception can be locally activated for (outgoing data of) the sending endpoint device, for (incoming data of) the receiving endpoint device or for both of them, depending on the corresponding real-time authorizations verified by the respective MNOs. Accordingly, the escrow encryption technique needs to be adapted to enable separate session key recovery by two LEAs. According to the present invention, the escrow encryption is performed by the sending endpoint device in all the cases cited above and lawful interception works for both incoming and outgoing data of the target endpoint device (i.e., the endpoint device/s subject to lawful interception). This is ensured by the MNOs responsible for establishing the connection between the two involved endpoint devices.

Typically, in the session key recovery, different LEAs are assisted by different DEAs depending on the corresponding country. According to the present invention, the information about the responsible LEAs is transmitted to the two involved endpoint devices by the corresponding MNOs. If one or both endpoint devices move cross-border in the same session, then one or both LEAs responsible for lawful interception would change. If this occurs, then, during the handover process, the corresponding endpoint device should perform a new escrow encryption of the same session key by using a new escrow encryption public key, for the new LEA assisted by new DEAs. In this way new LEA and DEAs can be able to perform the recovery of the same session key if authorized to do so.

The solution according to the present invention can be implemented in the architecture of next generation mobile networks as a service for E2E encryption of user plane data. For example, said service can be applied to phone calls, SMS (short message service), and MMS (multimedia messaging service). It can also be applied to any user plane data traffic over mobile network access (e.g., instant messaging service over mobile network access). More generally, it can also be adapted to deal with data traffic over direct Internet access for mobile or desktop endpoint devices (e.g., via WiFi).

In line of principle, the invention can also be applied to other types of data, such as internet data or app data.

An aspect of the present invention refers to a method for decryption of end-to-end encrypted messages.

Preferably, said messages are encrypted through user plane data encryption.

Preferably, the method comprises providing at least a first main computer system.

Preferably, the method comprises providing one or more first auxiliary computer systems.

Preferably, the method comprises generating and storing, at the first main computer system and each first auxiliary computer system, a respective random number $x0', x1' \ldots xn'$.

Preferably, each said respective random number is a share in a linear secret sharing scheme.

Preferably, the secret is $x'$.

Preferably, said secret $x'$ can be obtained from $x0'$ and an arbitrary subset of $k'$ out of n of said respective random numbers, wherein $k'$ is equal to or larger than 2 and equal to or smaller than n.

Preferably, the secret $x'$ is not calculated.

Preferably, the method comprises generating and storing, at the first main computer system and each of said first auxiliary computer systems, a respective first escrow encryption public key share, on the basis of the respective random number.

Preferably, the method comprises sending, from each first auxiliary computer system to the first main computer system, the respective first escrow encryption public key share.

Preferably, the method comprises calculating, at the first main computer system, a first escrow encryption public key by combining the first escrow encryption public key share of the first main computer system with the first escrow encryption public key shares of the first auxiliary computer systems.

Preferably, $x'$ is a first escrow decryption private key for decrypting strings which have been encrypted with said first escrow encryption public key.

Preferably, the method comprises determining, by a telecommunications network, that a first user equipment is to send user plane data to a second user equipment.

Preferably, the method comprises determining, by a cooperation of the first main computer system and said telecommunications network, if said first user equipment and/or said second user equipment is a target of lawful interception associated with the first main computer system.

Preferably, the method comprises, when user plane data are to be sent from said first user equipment to said second user equipment and said first user equipment and/or said second user equipment is a target of lawful interception, configuring said first user equipment to generate an end-to-end encrypted message.

Preferably, the end-to-end encrypted message is obtained by encrypting, with a session key, a plain message formed by said user plane data.

Preferably, said end-to-end encrypted message is intended for said second user equipment, to be decrypted by using the session key.

Preferably, the method comprises, when user plane data are to be sent from said first user equipment to said second user equipment, and said first user equipment and/or said second user equipment is a target of lawful interception, configuring said first user equipment to generate an attachment.

Preferably, the attachment is to be associated to said end-to-end encrypted message.

Preferably, said attachment includes at least an escrow encrypted key, obtained by encrypting said session key using an escrow encryption function and said first escrow encryption public key.

Preferably, an escrow decryption function corresponding to said escrow encryption function is homomorphic with respect to said first escrow decryption private key $x'$.

Preferably, the method comprises receiving from the first user equipment, at the first main computer system through said communications network, said end-to-end encrypted message and said attachment.

Preferably, the method comprises forwarding via said communications network said end-to-end encrypted message to said second user equipment, without said attachment.

Preferably, the method comprises sending from the first main computer system to each first auxiliary computer system a partial escrow decryption request.

Preferably, the method comprises receiving at the first main computer system, from each first auxiliary computer system, a partial escrow decryption response calculated on the basis of the respective random number and calculating a partial escrow decryption result of said first main computer system on the basis of the random number $x0'$.

Preferably, the method comprises decrypting said escrow encrypted key at the first main computer system using the partial escrow decryption responses from a subset of $k'$ out of n first auxiliary computer systems and the partial escrow decryption result of said first main computer system, thereby obtaining the session key in a shared way.

Preferably, the method comprises decrypting said end-to-end encrypted message using said session key, thereby obtaining said plain message at the first main computer system.

Preferably, the method comprises providing a second main computer system and one or more second auxiliary computer systems associated to said second main computer system.

Preferably, the method comprises generating and storing, at the second main computer system and each second auxiliary computer system, a respective random number $x0'', x1'' \ldots xm''$.

Preferably, each said respective random number is a share in a linear secret sharing scheme.

Preferably, the secret is $x''$.

Preferably, said secret $x''$ can be obtained from $x0''$ and an arbitrary subset of $k''$ of m said respective random numbers, wherein $k''$ is equal to or larger than 2 and equal to or smaller than m.

Preferably, the secret $x''$ is not calculated.

Preferably, the method comprises generating and storing, at the second main computer system and each of said second auxiliary computer systems, a respective second escrow encryption public key share, on the basis of the respective random number.

Preferably, the method comprises sending, from each second auxiliary computer system to the second main computer system the respective second escrow encryption public key share.

Preferably, the method comprises calculating, at the second main computer system, a second escrow encryption public key by combining the second escrow encryption public key share of the second main computer system with the second escrow encryption public key shares of the second auxiliary computer systems.

Preferably, $x''$ is a second escrow decryption private key for decrypting strings which have been encrypted with said second escrow encryption public key.

Preferably, lawful interception of said first user equipment is associated with said first main computer system and lawful interception of said second user equipment is associated with said second main computer system.

Preferably, by a cooperation of the second main computer system and said telecommunications network, it is determined if said second user equipment is a target of lawful interception associated with the second main computer system.

Preferably, if the first user equipment is a target of lawful interception associated with the first main computer system and the second user equipment is not a target of lawful interception, said first user equipment is configured to generate the escrow encrypted key by encrypting said session key using an escrow encryption function and said first escrow encryption public key, wherein an escrow decryption function corresponding to said escrow encryption function is homomorphic with respect to the first escrow decryption private key $x'$.

Preferably, if the first user equipment is a target of lawful interception associated with the first main computer system and the second user equipment is not a target of lawful interception, said escrow encrypted key is decrypted at the first main computer system, using partial escrow decryption responses from the first auxiliary computer systems and partial escrow decryption result from the main computer system, thereby obtaining the session key in a shared way.

Preferably, if the first user equipment is a target of lawful interception associated with the first main computer system and the second user equipment is not a target of lawful interception, said end-to-end encrypted message is decrypted at the first main computer system, using said session key thereby obtaining said plain message.

Preferably, if the second user equipment is a target for lawful interception associated with the second main computer system and the first user equipment is not a target of lawful interception, said first user equipment is configured to generate the escrow encrypted key by encrypting said session key using an escrow encryption function and said second escrow encryption public key, wherein an escrow decryption function corresponding to said escrow encryption function is homomorphic with respect to the second escrow decryption private key $x''$.

Preferably, if the second user equipment is a target for lawful interception associated with the second main computer system and the first user equipment is not a target of lawful interception, a partial escrow decryption request is sent from said second main computer system to each second auxiliary computer system.

Preferably, if the second user equipment is a target for lawful interception associated with the second main computer system and the first user equipment is not a target of lawful interception, from each second auxiliary computer system, a partial escrow decryption response is sent to the second main computer system, said escrow decryption response being calculated on the basis of the respective random number xi", and a partial escrow decryption result of said second main computer system is calculated on the basis of the random number x0".

Preferably, if the second user equipment is a target for lawful interception associated with the second main computer system and the first user equipment is not a target of lawful interception, at the second main computer system, said escrow encrypted key is decrypted using the partial escrow decryption responses from a subset of k" out of m second auxiliary computer systems and the partial escrow decryption result of said second main computer system, thereby obtaining the session key in a shared way.

Preferably, if the second user equipment is a target for lawful interception associated with the second main computer system and the first user equipment is not a target of lawful interception, said end-to-end encrypted message is decrypted at the second main computer system, using said session key, thereby obtaining said plain message.

Preferably, if the first user equipment is a target of lawful interception associated with the first main computer system and the second user equipment is a target of lawful interception associated with the second main computer system, said first user equipment is configured to generate the escrow encrypted key by encrypting said session key using an escrow encryption function and said first and second escrow encryption public keys, wherein an escrow decryption function corresponding to said escrow encryption function is homomorphic with respect to the first escrow decryption private key x' and is homomorphic with respect to the second escrow decryption private key x".

Preferably, if the first user equipment is a target of lawful interception associated with the first main computer system and the second user equipment is a target of lawful interception associated with the second main computer system, said escrow encrypted key is decrypted at the first main computer system, using the corresponding partial escrow decryption responses from the first auxiliary computer systems and the partial escrow decryption result of said first main computer system, thereby obtaining the session key in a shared way.

Preferably, if the first user equipment is a target of lawful interception associated with the first main computer system and the second user equipment is a target of lawful interception associated with the second main computer system, said escrow encrypted key is decrypted at the second main computer system, using the corresponding partial escrow decryption responses from the second auxiliary computer systems and the partial escrow decryption result of said second main computer system, thereby obtaining the session key in a shared way.

Preferably, if the first user equipment is a target of lawful interception associated with the first main computer system and the second user equipment is a target of lawful interception associated with the second main computer system, said end-to-end encrypted message is decrypted at both the first main computer system and the second main computer system, using said session key, thereby obtaining said plain message.

Preferably, said session key is a symmetric key established in common by said first and second user equipment by applying a cryptographic protocol for authenticated key establishment.

Preferably, said cryptographic protocol is an ephemeral Diffie-Hellman, DH, key exchange protocol based on long-term DH private/public key pairs locally generated and stored securely in each of said first and second user equipment.

Preferably, said cryptographic protocol comprises generation of a random ephemeral DH private/public key pair of the first user equipment.

Preferably, said cryptographic protocol comprises computation of ephemeral DH common key from said ephemeral DH private/public key pair and said long-term DH private/public key pair of said second user equipment.

Preferably, said cryptographic protocol comprises application of a key derivation function to said ephemeral DH common key to obtain said session key, to be used for symmetric-key encryption of user plane data in the session.

Preferably, the attachment also includes an information part.

Preferably, said information part includes a first indication identifying said first and/or second user equipment as a target of lawful interception.

Preferably, said information part includes a second indication identifying said first and/or second main computer system.

Preferably, said information part includes a timestamp.

Preferably, said escrow encryption of session key is derived by adapting ephemeral DH key exchange protocol.

Preferably, the escrow encryption of session key comprises generation of a random ephemeral DH private/public key pair of said first user equipment.

Preferably, the escrow encryption of session key comprises computation of ephemeral DH common key from said ephemeral DH private key of said first user equipment and DH first escrow public key PK of said first main computer system according to standard DH key exchange protocol.

Preferably, the escrow encryption of session key comprises generating the information part of escrow encrypted session key by concatenating identities of said first and/or second user equipment as targets of lawful interception, identity of said first main computer system, and said timestamp.

Preferably, the escrow encryption of session key comprises applying a key derivation function to the concatenation of said ephemeral DH common key and said information part, and then reversibly combining the result with the session key to obtain encryption part of said escrow encrypted session key.

Preferably, the escrow encryption of session key comprises assembling said escrow encrypted session key by concatenating said ephemeral DH public key, said information part, and said encryption part.

Preferably, said shared escrow decryption of said escrow encrypted session key is based on the homomorphic property of the exponential function in the underlying DH cyclic group with multiplicative notation, with respect to (modular) addition of exponents.

Preferably, each of said first and second main computer system is associated with a respective DH escrow public key $PK^I$ or $PK^{II}$, each corresponding to said first or second user equipment, respectively.

Preferably, said escrow encryption of session key is derived by adapting ephemeral tripartite DH key exchange protocol.

Preferably, the escrow encryption of session key comprises generation of a random ephemeral DH private/public key pair of said first user equipment.

Preferably, the escrow encryption of session key comprises computation of ephemeral tripartite DH common key from said ephemeral DH private key of said first user equipment and said DH escrow public keys $PK^I$ and $PK^{II}$ of said first and second main computer systems, respectively, according to tripartite DH key exchange protocol using a bilinear mapping over underlying DH cyclic groups.

Preferably, the escrow encryption of session key comprises generating the information part of escrow encrypted session key by concatenating identities of said first and second user equipment as targets of lawful interception, identities of said first and second main computer systems, and said timestamp.

Preferably, the escrow encryption of session key comprises applying a key derivation function to the concatenation of said ephemeral tripartite DH common key and said information part, and then reversibly combining the result with the session key to obtain encryption part of said escrow encrypted session key.

Preferably, the escrow encryption of session key comprises assembling escrow encrypted session key by concatenating said ephemeral DH public key, said information part, and said encryption part.

Preferably, said shared escrow decryption of said escrow encrypted session key is based on the homomorphic property of the exponential function resulting from said bilinear mapping in the underlying DH cyclic group with multiplicative notation, with respect to (modular) addition of exponents.

Preferably, said first and/or second main computer system, before said first user equipment is configured to generate said attachment, sends an authorization request to a respective authoritative computer system.

Preferably, said first and/or second main computer system, before said first user equipment is configured to generate said attachment, receives an authorization response from said respective authoritative computer system, in a form of appropriate lawful interception authorization certificate.

Preferably, said first and/or second main computer system corresponds to the respective actual location of said first and/or second user equipment in a mobile communication network.

Preferably, if said location changes during the same session, then in the handover process, said first and/or second main computer system and its respective escrow encryption public key are changed and the escrow encryption of the session key at the first user equipment is updated according to the changed first and/or second escrow encryption public keys.

Preferably, said linear secret sharing scheme is such that said first and/or second main computer system cannot obtain any information about the session key without said first and/or second auxiliary computer systems, respectively, and that said first and/or second auxiliary computer systems cannot themselves obtain any information about the session key, respectively.

An aspect of the present invention refers to a system for decryption of end-to-end encrypted messages.

Preferably, said messages are encrypted through user plane data encryption.

Preferably, said system comprising at least a first main computer system.

Preferably, said system comprises one or more first auxiliary computer systems.

Preferably, the first main computer system and each first auxiliary computer system is configured to generate and store a respective random number $x0'$, $x1'$ ... $xn'$.

Preferably, each said respective random number is a share in a linear secret sharing scheme.

Preferably, the secret is $x'$.

Preferably, said secret $x'$ can be obtained from $x0'$ and an arbitrary subset of $k'$ out of n said respective random numbers, wherein $k'$ is equal to or larger than 2 and equal to or smaller than n.

Preferably, the secret $x'$ is not calculated.

Preferably, the first main computer system and each of said first auxiliary computer systems is configured to generate and store a respective first escrow encryption public key share, on the basis of the respective random number.

Preferably, each first auxiliary computer system is configured to send to the first main computer system the respective first escrow encryption public key share.

Preferably, the first main computer system is configured to calculate a first escrow encryption public key by combining the first escrow encryption public key share of the first main computer system with the first escrow encryption public key shares of the first auxiliary computer systems, wherein $x'$ is a first escrow decryption private key for decrypting strings which have been encrypted with said first escrow encryption public key.

Preferably, a telecommunications network is configured to determine that a first user equipment is to send user plane data to a second user equipment.

Preferably, the first main computer system and said telecommunications network cooperate to determine if said first user equipment and/or said second user equipment is a target of lawful interception associated with the first main computer system.

Preferably, when user plane data are to be sent from said first user equipment to said second user equipment and said first user equipment and/or said second user equipment is a target of lawful interception, said first user equipment is configured to generate an end-to-end encrypted message obtained by encrypting, with a session key, a plain message formed by said user plane data, wherein said end-to-end encrypted message is intended for said second user equipment, to be decrypted by using the session key.

Preferably, when user plane data are to be sent from said first user equipment to said second user equipment and said first user equipment and/or said second user equipment is a target of lawful interception, said first user equipment is configured to generate an attachment to be associated to said end-to-end encrypted message, wherein said attachment includes at least an escrow encrypted key, obtained by encrypting said session key using an escrow encryption function and said first escrow encryption public key, wherein an escrow decryption function corresponding to said escrow encryption function is homomorphic with respect to said first escrow decryption private key $x'$.

Preferably, the first main computer system receives from the first user equipment through said communications network said end-to-end encrypted message and said attachment.

Preferably, said end-to-end encrypted message is forwarded to said second user equipment, without said attachment.

Preferably, the first main computer system sends to each first auxiliary computer system a partial escrow decryption request.

Preferably, from each first auxiliary computer system, the first main computer system receives a partial escrow decryption response, calculated on the basis of the respective random number $xi'$, and calculates a partial escrow decryption result of said first main computer system on the basis of the random number $x0'$.

Preferably, the first main computer system decrypts said escrow encrypted key using the partial escrow decryption responses from a subset of k' out of n first auxiliary computer systems and the partial escrow decryption result of said first main computer system, thereby obtaining the session key in a shared way.

Preferably, the first main computer system decrypts said end-to-end encrypted message using said session key, thereby obtaining said plain message.

Preferably, said system comprises a second main computer system.

Preferably, said system comprises one or more second auxiliary computer systems associated to said second main computer system.

Preferably, the second main computer system and each second auxiliary computer system is configured to generate and store a respective random number x0", x1" . . . xm", wherein each said respective random number is a share in a linear secret sharing scheme.

Preferably, the secret is x".

Preferably, said secret x" can be obtained from x0" and an arbitrary subset of k" of m said respective random numbers, wherein k" is equal to or larger than 2 and equal to or smaller than m.

Preferably, the secret x" is not calculated.

Preferably, the second main computer system and each of said second auxiliary computer systems is configured to generate and store a respective second escrow encryption public key share, based on the respective random number.

Preferably, each second auxiliary computer system is configured to send to the second main computer system the respective second escrow encryption public key share.

Preferably, the second main computer system is configured to calculate a second escrow encryption public key by combining the second escrow encryption public key share of the second main computer system with the second escrow encryption public key shares of the second auxiliary computer systems, wherein x" is a second escrow decryption private key for decrypting strings which have been encrypted with said second escrow encryption public key.

Preferably, lawful interception of said first user equipment is associated with said first main computer system and lawful interception of said second user equipment is associated with said second main computer system.

Preferably, if the first user equipment is a target of lawful interception associated with the first main computer system and the second user equipment is not a target of lawful interception, the escrow encrypted key is obtained by encrypting said session key using an escrow encryption function and said first escrow encryption public key, wherein an escrow decryption function corresponding to said escrow encryption function is homomorphic with respect to the first escrow decryption private key x'.

Preferably, if the first user equipment is a target of lawful interception associated with the first main computer system and the second user equipment is not a target of lawful interception, said escrow encrypted key is decrypted at the first main computer system, using partial escrow decryption responses from first auxiliary computer systems and partial escrow decryption result of the first main computer system, thereby obtaining the session key in a shared way.

Preferably, if the first user equipment is a target of lawful interception associated with the first main computer system and the second user equipment is not a target of lawful interception, said end-to-end encrypted message is decrypted at the first main computer system, using said session key, thereby obtaining said plain message.

Preferably, if the second user equipment is a target for lawful interception associated with the second main computer system and the first user equipment is not a target of lawful interception, the escrow encrypted key is obtained by encrypting said session key using an escrow encryption function and said second escrow encryption public key, wherein an escrow decryption function corresponding to said escrow encryption function is homomorphic with respect to the second escrow decryption private key x".

Preferably, if the second user equipment is a target for lawful interception associated with the second main computer system and the first user equipment is not a target of lawful interception, a partial escrow decryption request is sent from said second main computer system to each second auxiliary computer system.

Preferably, if the second user equipment is a target for lawful interception associated with the second main computer system and the first user equipment is not a target of lawful interception, from each second auxiliary computer system, a partial escrow decryption response is sent to the second main computer system, said escrow decryption response being calculated on the basis of the respective random number xi", and a partial escrow decryption result of said second main computer system is calculated on the basis of the random number x0".

Preferably, if the second user equipment is a target for lawful interception associated with the second main computer system and the first user equipment is not a target of lawful interception, at the second main computer system, said escrow encrypted key is decrypted using the escrow decryption responses from a subset of k" out of m second auxiliary computer systems and the partial escrow decryption result of said second main computer system, thereby obtaining the session key in a shared way.

Preferably, if the second user equipment is a target for lawful interception associated with the second main computer system and the first user equipment is not a target of lawful interception, said end-to-end encrypted message is decrypted at the second main computer system, using said session key thereby obtaining said plain message.

Preferably, if the first user equipment is a target of lawful interception associated with the first main computer system and the second user equipment is a target of lawful interception associated with the second main computer system, the escrow encrypted key is obtained by encrypting said session key using an escrow encryption function and said first and second escrow encryption public keys, wherein an escrow decryption function corresponding to said escrow encryption function is homomorphic with respect to the first escrow decryption private key x' and is homomorphic with respect to the second escrow decryption private key x".

Preferably, if the first user equipment is a target of lawful interception associated with the first main computer system and the second user equipment is a target of lawful interception associated with the second main computer system, said escrow encrypted key is decrypted at the first main computer system, using the corresponding partial escrow decryption responses from the first auxiliary computer systems and the partial escrow decryption result of said first main computer system, thereby obtaining the session key in a shared way.

Preferably, if the first user equipment is a target of lawful interception associated with the first main computer system and the second user equipment is a target of lawful interception associated with the second main computer system, said escrow encrypted key is decrypted at the second main computer system, using the corresponding partial escrow decryption responses from the second auxiliary computer systems and the partial escrow decryption result of said second main computer system, thereby obtaining the session key in a shared way.

Preferably, if the first user equipment is a target of lawful interception associated with the first main computer system and the second user equipment is a target of lawful interception associated with the second main computer system, said end-to-end encrypted message is decrypted at both the first main computer system and the second main computer system, using said session key thereby obtaining said plain message.

Preferably, said communications network is a mobile communication network, which can support said additional functional requirements, wherein said first user equipment and said second user equipment are implemented as mobile communication devices.

BRIEF DESCRIPTION OF THE DRAWINGS

These and other features and advantages of the present invention will be made apparent by the following detailed description of exemplary and non-limitative embodiments thereof. In the following description, reference will be made to the attached drawings, wherein.

Figure 1:
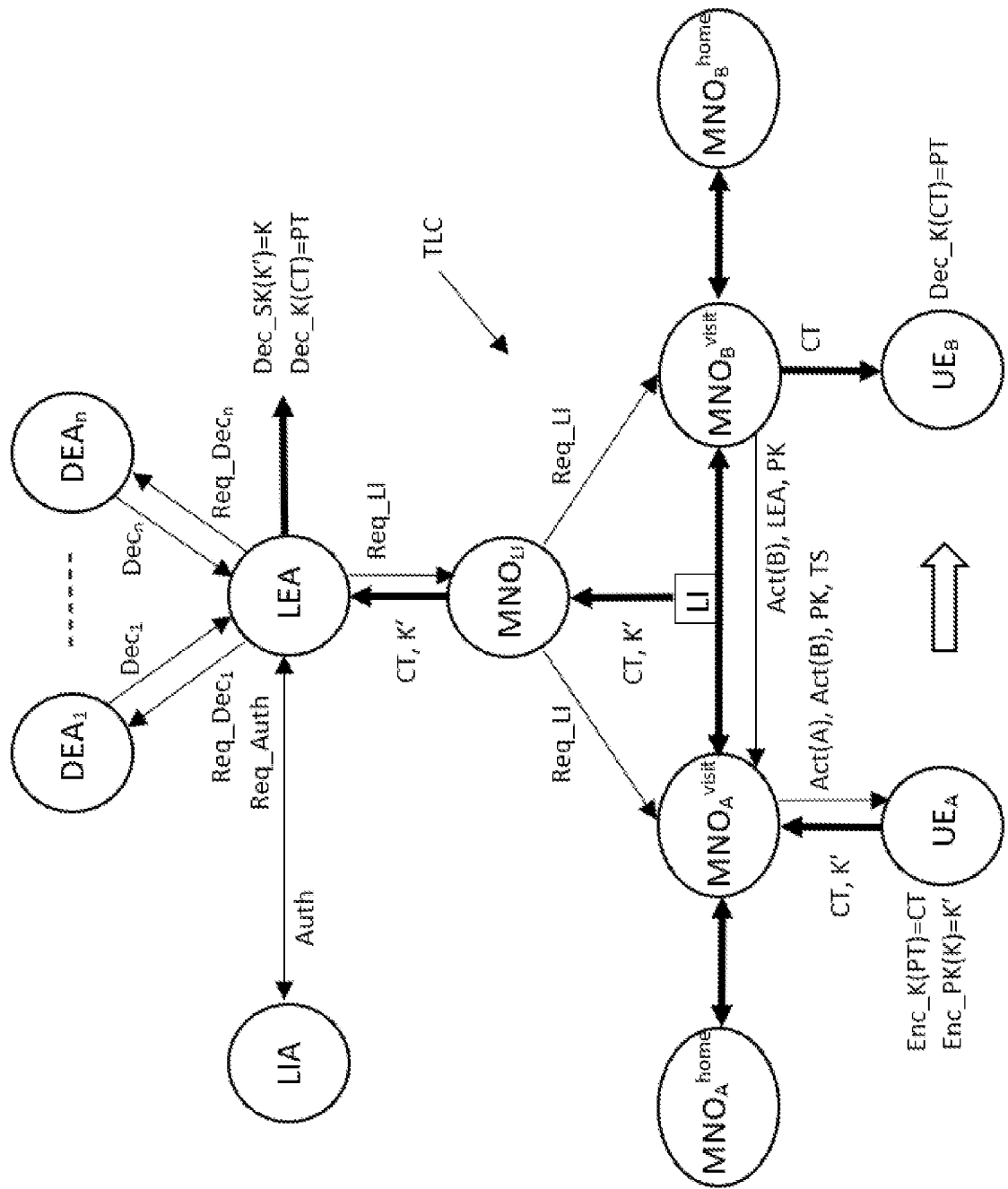
FIG. 1 is a block diagram of a first embodiment of the present invention.

DESCRIPTION OF PREFERRED
EMBODIMENTS OF THE INVENTION

The solution according to the present invention includes a system and method for decryption of encrypted messages for lawful interception. In particular, the solution according to the present invention includes a system and method for session key recovery for end-to-end (E2E) encryption of user plane data in mobile communication networks, involving a cooperation of at least two independent entities, and preferably at least three of them, namely, a LEA and at least two DEAs. Said system and method are adapted to deal with the mobility of endpoint devices according to roaming scenarios.

The Applicant remarks that, according to a preferred embodiment of the present invention, user plane data are encrypted at the network layer, that is, layer 3 of the OSI model protocol stack. However, the method according to the present invention can also be applied to encrypting user data at higher OSI layers (e.g., the transport or application layers).

The present invention proposes that the generation of the session keys for E2E encryption be separate from the session key recovery. Accordingly, the proposed solution also includes an associated system and method for authenticated session key establishment based on long-term public/private key pairs associated with the endpoint devices, where the public keys are authenticated (e.g., certified) by the corresponding MNOs.

The session key recovery method according to the present invention is based on a randomized escrow public-key encryption of the session key, where the corresponding escrow decryption function is expressed in terms of a function that is homomorphic with respect to an escrow decryption private key, as will be explained later. This enables shared escrow decryption of the encrypted session key by the LEA and DEAs which individually perform partial escrow decryption functions on their private pieces of escrow decryption information, without recovering the escrow decryption private key. Specifically, DEAs send their partial escrow decryption results to the LEA, which combines them together with its own partial decryption result so as to recover the session key. The session key recovery method according to the present invention is essentially a decryption escrow method in which the session key is encrypted by the endpoint device initiating a session (or sending a message in a session) by using a randomized escrow public-key encryption.

According to the present invention, in a mobility scenario in which the two involved endpoint devices are located in different countries, the escrow encryption technique described above needs to be adapted to enable separate session key recoveries by the two LEAs authorized for lawful interception in the two different countries where the two involved endpoint devices are currently located. If authorized, lawful interception is activated for both incoming and outgoing data of the target endpoint device/s (i.e., the endpoint device/s subject to lawful interception), while the escrow encryption is performed by the sending endpoint device.

According to the present invention, the activation of the lawful interception is implemented by using appropriate public keys for escrow encryption, namely, those of the corresponding LEAs, one or two of them, requesting lawful interception. Information about the escrow encryption public keys is exchanged between the MNOs serving the two endpoint devices, depending upon which of the two endpoint devices are the targets. The escrow encryption public keys need to be trusted by the MNOs, either directly or indirectly via a public-key certificate issued by a trusted third party. According to a preferred embodiment of the present invention, E2E encryption and escrow encryption are performed at the network level or network slice level, with endpoint device authentication/identification and lawful interception managed by the MNOs responsible for establishing the connection between the two endpoint devices, as better described below.

The lawful interception system implementing the method according to the present invention includes endpoint devices, MNOs, LEAs, and DEAs, as well as trusted independent entities issuing authorizations for lawful interception, i.e., lawful interception authorities (LIAs), which are preferably external to the system. In technical terms, the lawful interception system according to the present invention includes computer systems implemented and controlled by MNOs, LEAs, DEAs, and LIAs, respectively. Specifically, a LIA can be a single, centralized authority (e.g., a judicial authority) or a distributed authority, in which case a consensus of several authorities is required to issue authorization. Additionally, these constituent authorities can also control individual DEAs in the lawful interception system. In general, said system preferably distinguishes between two types of MNOs, namely, those managing a network infrastructure and those managing endpoint device subscription. The former are responsible for lawful interception and are denoted by $MNO_{LI}$, whereas the latter are responsible for activating escrow encryption and are denoted by $MNO^{subs}$. In practice, an $MNO_{LI}$ is also an $MNO^{subs}$, but an $MNO^{subs}$ need not be an $MNO_{LI}$. LIAs and modalities of issuing authorizations (e.g., via a court order) depend on local regulations and are hence not considered in the present disclosure. As usual, an $MNO^{subs}$ can have the role of either visited MNO, $MNO^{visit}$, or home MNO, $MNO^{home}$, where $MNO^{visit}$ can be the same as $MNO^{home}$. The Applicant notes that, in essence, $MNO^{visit}$ handles a mobile connection establishment, in the roaming scenario, whereas $MNO^{home}$ verifies endpoint device subscriptions for network access and provides (derived) credentials for a secure connection. $MNO^{visit}$ is chosen by an endpoint device according to inter-operator agreements of its $MNO^{home}$. A visited network is also called a serving network.

In the following, according to the present invention, an endpoint device able to be connected to the global mobile communication network comprising the network infrastructures of both an $MNO^{home}$ and an $MNO^{visit}$ is also referred to as User Equipment (UE), which in order to be connected to the global mobile communication network is typically equipped with a SIM (Subscriber Identity Module) card comprising subscription credentials, i.e., secret key pre-shared with $MNO^{home}$ and a globally unique identifier such as IMSI (International Mobile Subscriber Identity) in 4G and SUPI (Subscription Permanent Identifier) in 5G. Tamper-resistant secure hardware components, such as a SIM, implement a permanent binding of identities to the corresponding equipment. An endpoint device without a SIM card is also referred to as ME (Mobile Equipment) and it has its own identifier such as IMEI (International Mobile Equipment Identity). Another globally unique identifier that can be used is the mobile phone number, which is bound to the owner/user of the endpoint device. All such identifiers can be used in lawful interception to identify a target endpoint device. In a more general framework of IP networks, the IP address or a fixed phone number may also be used as a global identifier.

Figure 2:
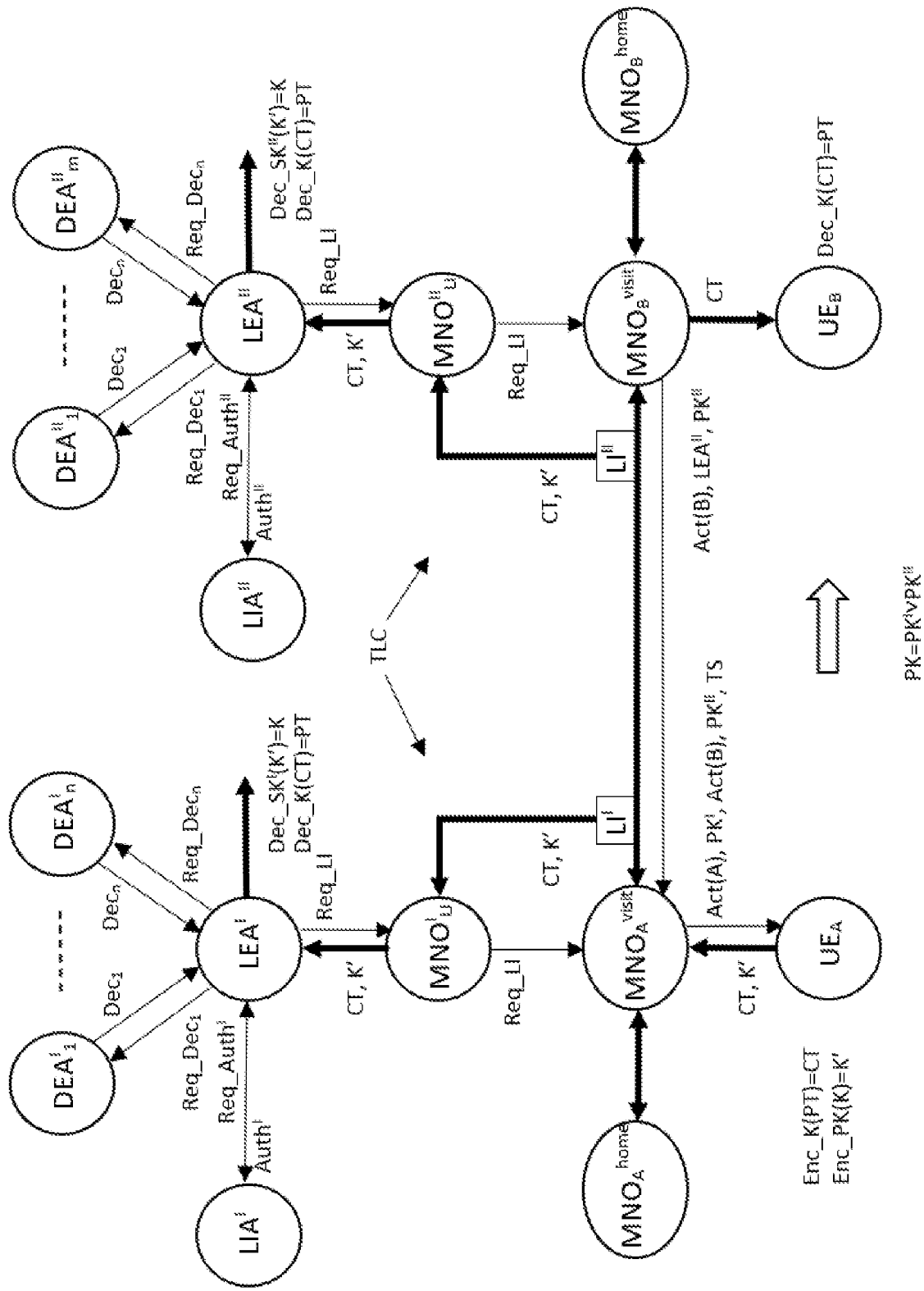
FIG. 2 is a block diagram of a second embodiment of the present invention.

In exemplary embodiments of the present invention, said lawful interception system corresponds to either one lawful interception dominion where both endpoint devices are currently located (as schematized in FIG. 1) or two (different) lawful interception dominions where the two endpoint devices are currently located (as schematized in FIG. 2). A lawful interception dominion typically corresponds to one country or to one administrative unit within a state or country. These two embodiments are referred to in the present specification as Scenario 1 and Scenario 2, respectively. Scenario 1 can be considered as a special case of a more general Scenario 2 in which the two dominions coincide.

Scenario 1: One Lawful Interception Dominion

The architecture and main functionalities of a lawful interception system in Scenario 1 are depicted in FIG. 1 and explained below.

The elements of the system shown in FIG. 1 include a first user equipment/sending endpoint device of identity A ($UE_A$), a second user equipment/receiving endpoint device of identity B ($UE_B$), a visiting MNO of $UE_A$ ($MNO_A^{visit}$), a visiting MNO of $UE_B$ ($MNO_B^{visit}$), the home MNO of $UE_A$ ($MNO_A^{home}$), the home MNO of $UE_B$ ($MNO_B^{home}$), a lawful interception MNO ($MNO_{LI}$) of a given dominion in which the two user equipments/endpoint devices are currently located, a main computer system (LEA), which represents a law enforcement agency in said dominion, an authoritative computer system (LIA), which represents a lawful interception authority in said dominion, and n auxiliary computer systems ($DEA_1, \ldots, DEA_n$), each of which represents a respective decryption escrow agent. In a preferred embodiment, $n \geq 2$; preferably, the n DEAs are mutually administratively independent and administratively independent of LEA. In technical terms, it is assumed that the lawful interception system in Scenario 1 includes the computer systems implemented and controlled by the involved MNOs, LEAs, DEAs, and LIAs, respectively. This assumption is implicit in FIG. 1.

It has to be noted that, in the context of the present invention, "computer system" is intended to mean a set of hardware resources (at least one processor and a memory, plus the necessary connection modules/capabilities) which are per se known from a hardware standpoint, but which are specifically programmed (in terms of software resources including operating system and application software) so as to perform the operations herein disclosed and claimed.

In the considered dominion, LEA sends a lawful interception authorization request Req_Auth to LIA, said authorization request Req_Auth comprising a list of endpoint device identifiers ID and time intervals T for which lawful interception is requested; preferably, each endpoint device identifier ID is associated with evidence why lawful interception is requested. LIA examines said authorization request and sends to LEA a digitally signed authorization list Auth of endpoint device identifiers ID and time intervals T for which lawful interception is authorized in the considered dominion. In a preferred embodiment, each entry (LIA, LEA, ID, T) of the list is digitally signed by LIA as (LIA, LEA, ID, T)$_{sign}$, which is referred to in the present invention as an authorization certificate. LEA verifies the authenticity of Auth and then updates its local database of authorized lawful interception requests as authorization certificates (LIA, LEA, ID, T)$_{sign}$. In due time, LEA then generates a lawful interception request Req_LI and sends it to $MNO_{LI}$. Req_LI comprises a list of authorization certificates (LIA, LEA, ID, T)$_{sign}$, possibly together with other information of interest. Req_LI is digitally signed by LEA, and $MNO_{LI}$, after having verified the signature, sends back an ACK to the LEA. $MNO_{LI}$ also maintains a database of all received and verified Req_LI.

$MNO_{LI}$ forwards each received and verified Req_LI to all relevant $MNOs^{subs}$ in the considered dominion, by broadcasting or multicasting, and each $MNOs^{subs}$ sends back an ACK to the $MNO_{LI}$ upon receiving it. With respect to a given endpoint device at a given time, each subscription $MNO^{subs}$ can have the role of a home MNO ($MNO^{home}$) or a visiting MNO ($MNO^{visit}$). Each subscription $MNO^{subs}$ verifies the authenticity of each received authorization certificate (LIA, LEA, ID, T)$_{sign}$ (included in the received Req_LI) and maintains an updated database DB_LI of all (LIA, LEA, ID, T)$_{sign}$ received over time and, in particular, those being subject to a current/active lawful interception request.

According to the present invention, a globally unique identifier ID of each endpoint device can correspond, for example, to the IMSI in 4G or the SUPI in 5G.

It should be noted that, in the process of getting accesses to the respective mobile communication network through $MNO_A^{visit}$ and $MNO_B^{visit}$, the IDs of user equipments/endpoint devices $UE_A$ and $UE_B$ get tested against the local databases $DB\_LI_A$ of $MNO_A^{visit}$ and $DB\_LI_B$ of $MNO_B^{visit}$, respectively, in order to determine if they are targets of lawful interception in the considered dominion. Then preparatory steps, which can include notification of $MNO_{LI}$ about the real-time presence of target endpoint devices, can be taken. It should also be noted that, if the ID of the user equipment/endpoint device corresponds to a SUPI, according to the 3GPP 5G technical specification (3GPP TS 33.501, Security Architecture and Procedures for 5G System, v 15.5.0, Rel. 15, June 2019), it is concealed by encryption on the SIM card. This implies that a cooperation of the corresponding $MNO^{home}$ is needed to recover the SUPI.

According to the Scenario 1 shown in FIG. 1, when a first user equipment $UE_A$ of identity A initiates establishment of a session with a second user equipment $UE_B$ of identity B, provided that both $UE_A$ and $UE_B$ are connected to the respective mobile communication networks, then $MNO_A^{visit}$ identifies $MNO_B^{visit}$ (via $MNO_B^{home}$) as the visited MNO for $UE_B$ and, before $UE_A$ sends any user plane data in the session, $MNO_A^{visit}$ first obtains from $MNO_B^{visit}$ an activation request, Act(B), indicating if the endpoint device of identity B is a target of lawful interception, which is extracted from the local $DB\_LI_B$ of $MNO_B^{visit}$. Then $MNO_A^{visit}$ sends to $UE_A$ a command activation request Comm_LI=Act(A), Act (B), PK, TS, where Act(A) is extracted from the local $DB\_LI_A$ of $MNO_A^{visit}$, PK is the escrow public key of the LEA, and TS is a timestamp specified by $MNO_A^{visit}$. If neither endpoint device of identity A nor endpoint device of identity B are targets of lawful interception, then said command request sent to $UE_A$ is null and the E2E session for user plane data can start.

$UE_A$ and $UE_B$ first engage in a cryptographic protocol for authenticated establishment of a symmetric session key K (where a preferred embodiment is schematized in FIG. 3) and then $UE_A$ sends to $UE_B$ encrypted user plane data as ciphertext CT=Enc_K(PT) for a given plaintext PT; $UE_B$ decrypts CT as Dec_K(CT)=PT. In the context of the present invention, this is a basic communication process between $UE_A$ and $UE_B$, which occurs regardless of whether $UE_A$ and/or $UE_B$ are target endpoint device(s) of lawful interception.

In case $UE_A$ and/or $UE_B$ is a target of lawful interception (i.e., in terms of identities, if A, B, or both are target(s)), $UE_A$ also sends out, as attachment to CT, an escrow encrypted session key K'=Enc_PK(K). According to the present invention, the assumption to enable shared escrow decryption of said escrow encrypted session key without disclosing the private pieces of escrow decryption information owned by each of the n auxiliary computer systems ($DEA_1, \ldots, DEA_n$) is that the escrow decryption function can be expressed in terms of a function that is homomorphic with respect to an escrow decryption private key, as will be explained later. In the following, "attachment" and "escrow encrypted session key" will be used interchangeably, and both will be designated as K'.

In parallel, provided that $UE_A$ and/or $UE_B$ is a target of lawful interception (i.e., A, B, or both), $MNO_{LI}$ intercepts CT and K' by using a lawful interception probe LI and forwards them to LEA, while said probe LI removes K' from the message forwarded to $UE_B$. According to the present invention, K'=Enc_PK(K) includes a randomization part R, an information part Inf, and an encryption part K̂. The information part is specified as Inf=$Target_{UE}$, $Target_{LEA}$, TS, where $Target_{UE}$=A∨B (i.e., A, B, or both) is a non-empty ordered set of identities of target endpoint device(s) of lawful interception, $Target_{LEA}$=LEA denotes an identity of LEA requesting lawful interception, and TS is a timestamp sent to $UE_A$ by $MNO_A^{visit}$, as described before. The randomization part R is needed for partial escrow decryption and the information part Inf is needed for verifying the authorization for lawful interception. In order to recover said session key K from the encryption part K̂ and the randomization part R of K' by shared escrow decryption, LEA sends a partial escrow decryption request $Req\_Dec_i$ to $DEA_i$ (where i=1, . . . , n). Preferably, the partial escrow decryption request $Req\_Dec_i$ comprises an authorization certificate Auth=(LIA, LEA, ID, T)$_{sign}$, signed by LIA, for one or two ID(s) (elements of $Target_{UE}$, i.e., ID=A or ID=B), and a request (LEA, $DEA_i$, R, Inf)$_{sign}$, signed by LEA, for each $DEA_i$ (i=1, . . . , n).

Each $DEA_i$ verifies the signatures in (LIA, LEA, ID, T)$_{sign}$ and (LEA, $DEA_i$, R, Inf)$_{sign}$ as well as if ID belongs to $Target_{UE}$ and if TS from Inf belongs to T. If these verifications are all positive, then $DEA_i$ computes the requested partial escrow decryption result by using R and its private piece of escrow decryption information and sends back the obtained result to LEA. If not, then $DEA_i$ sends back a negative ACK to LEA. In the former case, LEA computes its own partial escrow decryption result by using its own private piece of escrow decryption information and then combines it with the received partial escrow decryption results from the DEAs to recover said session key K from the encryption part K̂ of K'. The escrow decryption function is thus computed in a distributed and fully private manner without ever using or reconstructing an escrow decryption private key SK. Finally, LEA decrypts CT into PT.

The encryption part K̂ of K' is only needed for recovering K by LEA and, as such, is not preferably sent to the DEAs. In a preferred embodiment, in order to ensure accountability and minimize needed trust in LEA, the randomization R and information Inf parts of K' are bound together by a digital signature of the sending endpoint device $UE_A$, by using its long-term private key, possibly the same as in the cryptographic protocol for session key establishment explained below with reference to FIG. 3.

Scenario 2: Two Lawful Interception Dominions

The architecture and main functionalities of a lawful interception system in Scenario 2 are depicted in FIG. 2 and explained below.

The technology disclosed hereabove in connection with Scenario 1 is also employed in the embodiment related to Scenario 2, the main difference being that two distinct Law Enforcement Agencies (LEAs), as well as two distinct $MNO_{LI}$, are involved. Each Lawful Enforcement Agency is represented by a respective computer system ($LEA^I$, $LEA^{II}$) in FIGS. 2 and 5a-5b. Each $MNO_{LI}$ is represented by a respective computer system ($MNO^I_{LI}$, $MNO^{II}_{LI}$) in FIG. 2.

The elements of the system shown in FIG. 2 include a first user equipment/sending endpoint device of identity A ($UE_A$), a second user equipment/receiving endpoint of identity B ($UE_B$), a visiting MNO of $UE_A$($MNO_A^{visit}$), a visiting MNO of $UE_B$ ($MNO_B^{visit}$), the home MNO of $UE_A$ ($MNO_A^{home}$), the home MNO of $UE_B$ ($MNO_B^{home}$), lawful interception MNOs of dominions I and II ($MNO^I_{LI}$ and $MNO^{II}_{LI}$), law enforcement agencies in said dominions I and II ($LEA^I$ and $LEA^{II}$), lawful interception authorities in said dominions I and II ($LIA^I$ and $LIA^{II}$), n decryption escrow agents ($DEA^I_1, \ldots, DEA^I_n$) in dominion I and m decryption escrow agents ($DEA^{II}_1, \ldots, DEA^{II}_m$) in dominion II, respectively. In a preferred embodiment, in dominion I, n≥2 and the n DEAs are mutually administratively independent and administratively independent of $LEA^I$ and, similarly, in dominion II, m≥2 and the m DEAs are mutually administratively independent and administratively independent of $LEA^{II}$. In technical terms, the said lawful interception system in Scenario 2 includes the computer systems implemented and controlled by the involved MNOs, LEAs, DEAs, and LIAs, respectively. This assumption is implicit in FIG. 2.

In the following description of Scenario 2, for simplicity, LEA, LIA, Auth, and $MNO_{LI}$ are used as a generic notation for LEA$^I$ or LEA$^{II}$, LIA$^I$ or LIA$^{II}$, Auth$^I$ or Auth$^{II}$, and MNO$^{ILI}$ or MNO$^{ILI}$, respectively. Analogously, DEA$_i$ is used as a generic notation for DEA$^I_i$ or DEA$^{II}_i$, in dominion I with n decryption escrow agents or in dominion II with m decryption escrow agents, respectively. Also, ID and T are used as a generic notation for ID$^I$ or ID$^{II}$ and T$^I$ or T$^{II}$, respectively.

In said dominion I or II, LEA sends a lawful interception authorization request Req_Auth to LIA, said request comprising a list of endpoint device identifiers ID and time intervals T for which lawful interception is requested; preferably, each endpoint device identifier ID is associated with evidence why lawful interception is requested. LIA examines said request and sends to LEA a digitally signed authorization list Auth of endpoint device identifiers ID and time intervals T for which lawful interception is authorized in said dominion I or II. In a preferred embodiment, each entry (LIA, LEA, ID, T) in this list is digitally signed by LIA as an authorization certificate (LIA, LEA, ID, T)$_{sign}$. LEA verifies the authenticity of Auth and then updates its local database of authorized lawful interception requests as authorization certificates (LIA, LEA, ID, T)$_{sign}$. In due time, LEA then generates a lawful interception request Req_LI and sends it to MNO$_{LI}$. Req_LI comprises a list of authorization certificates (LIA, LEA, ID, T)$_{sign}$, possibly together with other information of interest. Req_LI is digitally signed by LEA, and MNO$_{LI}$, after having verified the signature, sends back an ACK to the LEA. MNO$_{LI}$ also maintains a database of all received and verified Req_LI.

MNO$_{LI}$ forwards each received and verified Req_LI to all relevant MNOs$^{subs}$ in said dominion I or II, by broadcasting or multicasting, and each MNO$^{subs}$ sends back an ACK to the MNO$_{LI}$ upon receiving it. With respect to a given endpoint device at a given time, each subscription MNO$^{subs}$ can have a role of a home MNO (MNO$^{home}$) or a visiting MNO (MNO$^{visit}$). Each subscription MNO$^{subs}$ verifies the authenticity of each received authorization certificate (LIA, LEA, ID, T)$_{sign}$. Each subscription MNO$^{subs}$ maintains an updated database DB_LI of all (LIA, LEA, ID, T)$_{sign}$ received over time and, in particular, those that are subject to a current/active lawful interception request. According to the present invention, a globally unique identifier ID of each endpoint device can correspond to the IMSI in 4G or the SUPI in 5G.

It should be noted that in the process of getting accesses to the respective mobile communication network through MNO$_A^{visit}$ in dominion I and MNO$_B^{visit}$ in dominion II, the IDs of user equipment/endpoint devices UE$_A$ and UE$_B$ get tested against the local databases DB_LI$_A$ of MNO$_A^{visit}$ and DB_LI$_B$ of MNO$_B^{visit}$, respectively, in order to determine if they are target endpoint devices of lawful interception in said dominion I or II. Then preparatory steps, which can include notification of MNO$_{LI}$ about the real-time presence of target endpoint devices, can be taken. It should also be noted that if the ID of the user equipment/endpoint device corresponds to a SUPI, according to the 3GPP 5G technical specification (3GPP TS 33.501, Security Architecture and Procedures for 5G System, v 15.5.0, Rel. 15, June 2019), it is concealed by encryption on the SIM card. This implies that a cooperation of the corresponding MNO$^{home}$ is needed to recover the SUPI.

According to Scenario 2 shown in FIG. 2, a first user equipment UE$_A$ of identity A initiates establishment of a session with a second user equipment UE$_B$ of identity B, where both UE$_A$ and UE$_B$ are connected to the respective mobile communication networks. Then MNO$_A^{visit}$ identifies MNO$_B^{visit}$ (via MNO$_B^{home}$) as the visited MNO for UE$_B$ and, before UE$_A$ sends any user plane data in the session, MNO$_A^{visit}$ first obtains from MNO$_B^{visit}$ an activation request, Act(B), indicating if the endpoint device of identity B is a target of lawful interception, which is extracted from the local DB_LI$_B$ of MNO$_B^{visit}$, together with the escrow public key PK$^{II}$ of LEA$^{II}$ in dominion II. Then MNO$_A^{visit}$ sends to UE$_A$ a command activation request Comm_LI=Act(A), PK$^I$, Act(B), PK$^{II}$, TS, where Act(A) is extracted from the local DB_LI$_A$ of MNO$_A^{visit}$, PK$^I$ is the escrow public key of LEA$^I$ in dominion I, and TS is a timestamp specified by MNO$_A^{visit}$. If neither endpoint device of identity A nor endpoint device of identity B are targets of lawful interception, then said command request sent to UE$_A$ is null and the E2E session for user plane data can start.

UE$_A$ and UE$_B$ first engage in a cryptographic protocol for authenticated establishment of symmetric session key K (where a preferred embodiment is schematized in FIG. 3, as better described in the following) and then UE$_A$ sends to UE$_B$ encrypted user plane data as ciphertext CT=Enc_K(PT) for a given plaintext PT. UE$_B$ decrypts CT as Dec_K(CT)=PT. In the context of the present invention, this is a basic communication process between UE$_A$ and UE$_B$, which occurs regardless of whether UE$_A$ and/or UE$_B$ are target endpoint device(s) of lawful interception.

If UE$_A$ and/or UE$_B$ is a target of lawful interception (i.e., in terms of identities, if A, B, or both are target(s)), then UE$_A$ also sends out, as attachment to CT, an escrow encrypted session key K'=Enc_PK(K), where PK=PK$^I$∨PK$^{II}$ is defined as PK$^I$ if UE$_A$ is a target, as PK$^{II}$ if UE$_B$ is a target, and as (PK$^I$, PK$^{II}$) if both UE$_A$ and UE$_B$ targets. Escrow encryption of the session key K thus depends on whether UE$_A$, UE$_B$ or both are targets of lawful interception. According to the present invention, the assumption to enable shared escrow decryption of said escrow encrypted session key K without disclosing the private pieces of escrow decryption information owned by each of the n auxiliary computer systems (DEA$_1$, ..., DEA$_n$) and/or m auxiliary computer systems (DEA$_1$, ..., DEA$_m$) is that the escrow decryption function can be expressed in terms of a function that is homomorphic with respect to an escrow decryption private key.

In parallel, in said dominion I or II, provided that UE$_A$ in dominion I and/or UE$_B$ in dominion II is a target of lawful interception, MNO$_{LI}$ intercepts CT and K' by using a lawful interception probe and forwards them to LEA. Lawful interception probe LII in dominion I removes K' from the message forwarded to UE$_B$ if identity B is not a target identity of lawful interception in dominion II. If identity B is a target identity of lawful interception in dominion II, then lawful interception probe LI$^{II}$ in dominion II removes K' from the message forwarded to UE$_B$. According to the present invention, K'=Enc_PK(K), where PK=PK$^I$∨PK$^{II}$, includes a randomization part R, an information part Inf, and an encryption part K̂. The information part Inf is specified as Inf=Target$_{UE}$, Target$_{LEA}$, TS, where Target$_{UE}$=A∨B is a non-empty ordered set of identities of target endpoint device(s) of lawful interception, Target$_{LEA}$=LEA$^I$∨LEA$^{II}$ is a non-empty ordered set of identities of LEAs requesting lawful interception, and TS is a timestamp sent to UE$_A$ by MNO$_A^{visit}$, as described before. The randomization part R is needed for partial escrow decryption and the information part Inf is needed for verifying the authorization for lawful interception. In order to recover said session key K from the encryption part K̂ of K' and the randomization part R by shared escrow decryption, LEA sends a partial escrow decryption request Req_Dec$_i$ to DEA$_i$ (where i=1, ..., n in dominion I and i=1, ..., m in dominion II) comprising an authorization certificate Auth=(LIA, LEA, ID, T)$_{sign}$, signed by LIA and a request (LEA, DEA$_i$, R, Inf)$_{sign}$, signed by LEA, for each DEA$_i$ (i=1, . . . , n in dominion I and i=1, . . . , m in dominion II).

Each DEA$_i$ verifies the signatures in (LIA, LEA, ID, T)$_{sign}$ and (LEA, DEA$_i$, R, Inf)$_{sign}$ as well as if ID equals identity A from Inf for dominion I, if ID equals identity B from Inf for dominion II, and if TS from Inf belongs to T (that is, T$^I$ in dominion I and T$^{II}$ in dominion II). If these verifications are all positive, then DEA$_i$ computes the requested partial escrow decryption result by using R and its private piece of escrow decryption information and sends back the obtained result to LEA. If not, then DEA$_i$ sends back a negative ACK to LEA. In the former case, LEA computes its own partial escrow decryption result by using its own private piece of escrow decryption information and then combines it with the received partial escrow decryption results from the DEAs to recover said session key K from the encryption part k of K'. Escrow decryption of K' in dominion I or II thus depends only on the corresponding escrow decryption private key SK$^I$ or SK$^{II}$, respectively, and hence no cooperation between LEA$^I$ and LEA$^{II}$ is needed for recovering K from K'. Importantly, in both dominion I and II, the escrow decryption function is thus computed in a distributed and fully private manner without ever using or reconstructing the escrow decryption private keys. Finally, in dominion I or dominion II, LEA then decrypts CT into PT.

The encryption part $\hat{K}$ of K' is only needed for recovering K and, as such, is preferably not sent to the DEAs. In a preferred embodiment, in order to ensure accountability and minimize needed trust in LEA, the randomization R and information Inf parts of K' are bound together by a digital signature of the sending endpoint device UE$_A$, by using its long-term private key, possibly the same as in the cryptographic protocol for session key establishment explained below with reference to FIG. 3.

Cryptographic Protocol for Session Key Establishment

Figure 3:
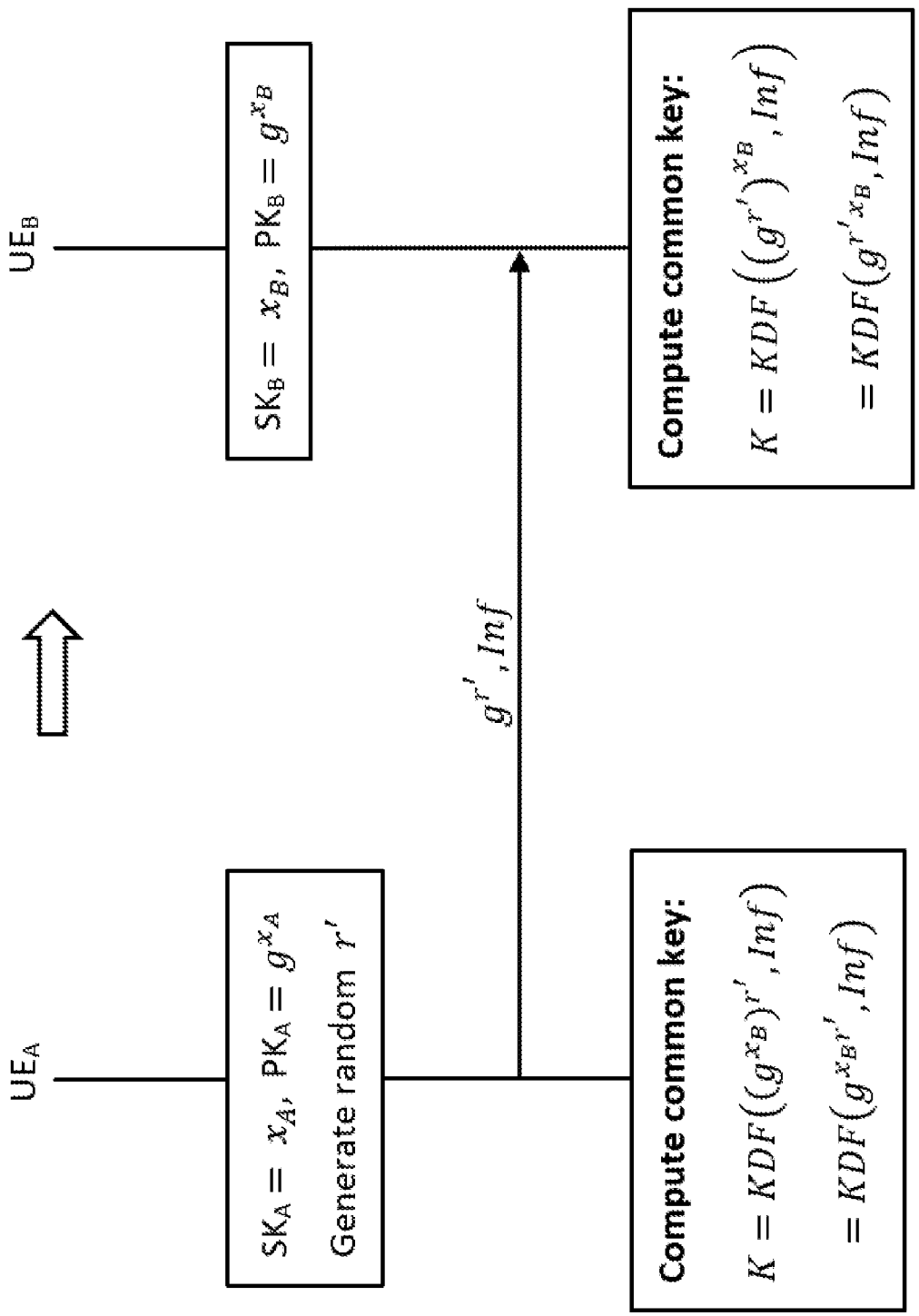
FIG. 3 is a diagram showing communication between two elements belonging to both FIGS. 1 and 2.

A preferred embodiment of the establishment of the symmetric session key for E2E encryption is depicted in FIG. 3. A preferred cryptographic protocol for authenticated session key establishment corresponds to ephemeral Diffie-Hellman (DH) key exchange protocol based on long-term private/public key pairs securely generated and stored locally in the endpoint devices involved in the communication. The long-term public keys are implicitly authentic if provided by the corresponding MNOs providing access to their mobile communication networks, since the MNOs are already trusted with respect to maintaining the authenticity of mobile phone numbers of users in their networks. Moreover, said preferred cryptographic protocol can additionally use standard public-key certificates issued by MNOs$^{home}$, i.e., digitally signed after the corresponding verifications (e.g., X.509). Such public-key certificates bind the long-term public keys of users to their mobile phone numbers or possibly other identifiers.

Prior to describing in more detail the solution shown in FIG. 3, some preliminary definitions and explanations will be provided, which are useful for a better understanding of the solution according to the present invention.

Let G denote a cyclic finite group of a large order q, with respect to a binary group operation which, in multiplicative terminology and notation, is called multiplication. Let g denote a generator of that group, that is, an element whose (integer) powers generate all elements of the group, with 1 as the neutral element. It follows that such a group is commutative. Accordingly, all elements of G can be represented as powers $\{g^i | i \in \mathbb{Z}_q\}$, where $\mathbb{Z}_q\{0, 1, \ldots, q-1\}$, and all non-neutral elements of G as powers $\{g^i | i \in \mathbb{Z}_q^*\}$, where $\mathbb{Z}_q^* = \{1, \ldots, q-1\}$. In additive terminology and notation, a group operation is called addition, with 0 as the neutral element. In this case every element of the group can be obtained as an integer multiple of a generator, which is called a scalar multiple. Scalar multiples thus correspond to powers and scalar multiplication to exponentiation. Every cyclic group of order q is thus isomorphic to $\mathbb{Z}_q$, the additive group of integers mod q, which is the cyclic group of order q with respect to addition of integers mod q, and its generators are integers coprime to q. If G has a prime order p, then any element of G different from 1 is a generator, and such a group is called a prime group. For a prime p, $\mathbb{Z}_p^*$ is a cyclic group of order p−1 with respect to multiplication of integers mod p. It is called a multiplicative group of integers mod p.

It should be noted that additive terminology and notation are used for a cyclic subgroup of a large prime order of an elliptic curve group over a finite field, where elements of the group are points on an elliptic curve and the binary group operation is addition of these points. Such a group is important since the addition of elliptic curve points can be efficiently implemented on a battery-operated mobile endpoint device, whose computational power is constrained.

In the setup phase of the cryptographic protocol for session key establishment depicted in FIG. 3, a sending endpoint device UE$_A$ and a receiving endpoint device UE$_B$ securely generate and store locally their long-term private/public key pairs SK$_A$=x$_A$/PK$_A$=g$^{x_A}$ and SK$_B$=x$_B$/PK$_B$=g$^{x_B}$, respectively, by using the same generator g of an adopted/standardized (globally or locally) cyclic group G of a large prime order p. Here, said private keys are randomly chosen from $\mathbb{Z}_p^*$ (more generally, the order of G need not be a prime). In a preferred embodiment, G is a prime subgroup of an elliptic curve group. To authenticate the user long-term public keys, MNOs$^{home}$ can issue public-key certificates which bind these keys to the user mobile phone numbers. Instead of MNOs$^{home}$, any other trusted third party (i.e., certification authority) can also be used. Such public-key certificates can be exchanged and verified in real time before running the cryptographic protocol depicted in FIG. 3. The verified public keys can then be kept in local memory of endpoint devices for future communications. With the authentication of long-term public keys, session key establishment becomes authenticated session key establishment, which is not vulnerable to man-in-the-middle attacks provided that the entities issuing the public-key certificates are trusted.

In the preferred ephemeral Diffie-Hellman key exchange protocol over G, which is depicted in FIG. 3, a sending endpoint device UE$_A$ generates a (truly) random number r', wherein r'$\in \mathbb{Z}_p^*$, as an ephemeral Diffie-Hellman private key, and computes and sends to a receiving endpoint device UE$_B$ the corresponding ephemeral Diffie-Hellman public key g$^{r'}$. The two endpoint devices can then compute the ephemeral common key according to the standard Diffie-Hellman key exchange protocol. More precisely, UE$_A$ computes $(g^{x_B})^{r'} = g^{x_B r'}$ and UE$_B$ computes $(g^{r'})^{x_B} = g^{r' x_B}$ and then, since $g^{x_B r'} = g^{r' x_B}$ (due to commutativity of multiplication of integers mod p), they both compute the same session key K by applying the same key derivation function (KDF) to the common key, which is defined as a secure, e.g., standardized, cryptographic hash function. For elliptic curve groups, the protocol is commonly referred to as (ephemeral) elliptic-curve Diffie-Hellman (ECDH) key exchange protocol.

The main role of KDF is to adapt the bit size of K which can be shorter than the bit size of the common Diffie-Hellman key. The argument of KDF can possibly include some additional public information Inf, such as a timestamp, which can enable a secure generation of multiple session keys from the same random number r'. This public information Inf can be transmitted from $UE_A$ to $UE_B$ along with the ephemeral public key $g^{r'}$. An external attacker, not knowing r', cannot illegitimately compute a new session key K from an altered Inf, provided that KDF is secure. A timestamp thus protects against replay attacks.

Cryptographic Protocol for One Lawful Interception Dominion in Scenario 1

Figure 4:
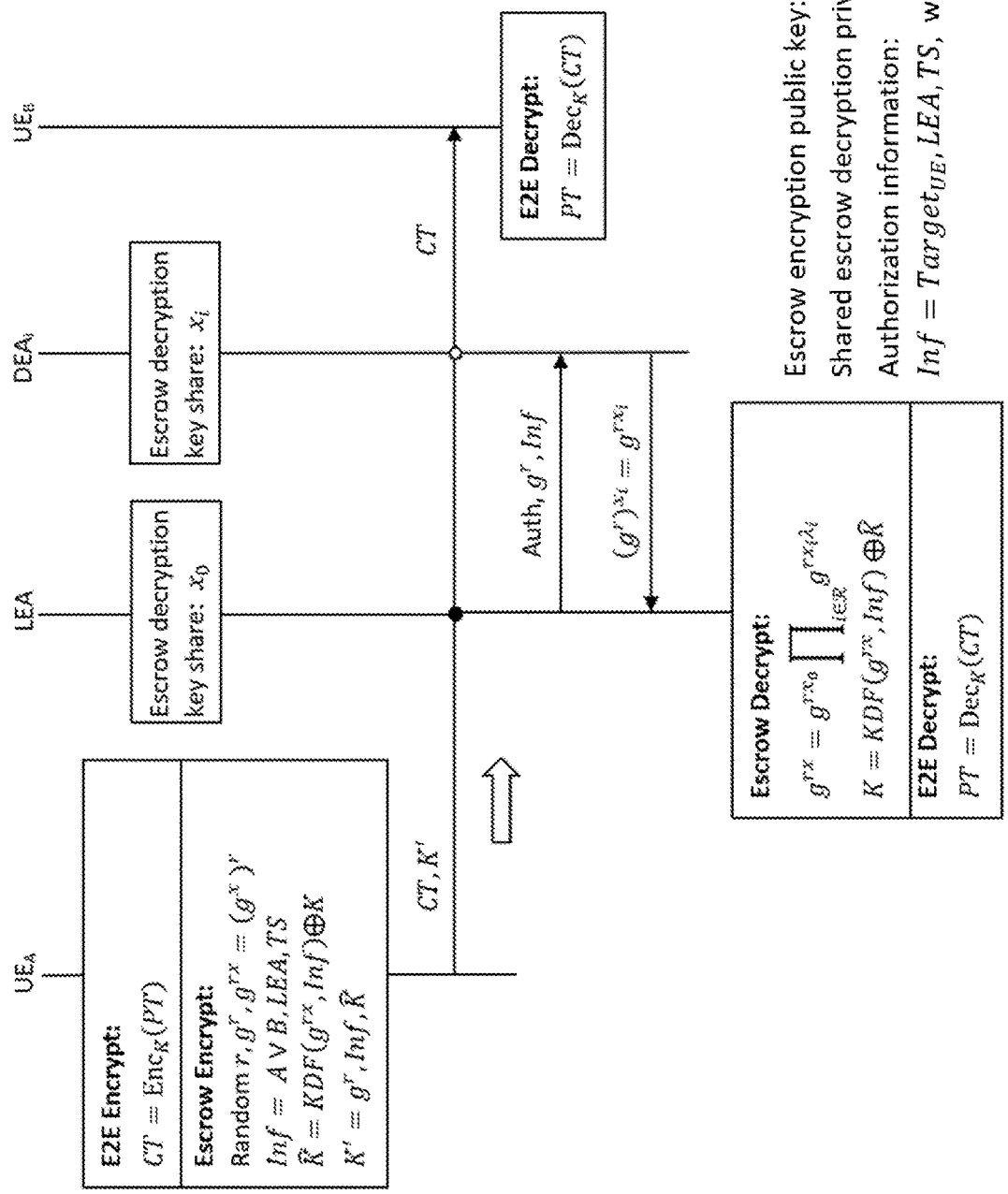
FIG. 4 is a diagram showing information exchanges related to the embodiment of FIG. 1.

A preferred cryptographic protocol for shared recovery of symmetric session key for E2E encryption in Scenario 1 with a single lawful interception dominion is depicted in FIG. 4. This protocol is based on randomized escrow encryption of the symmetric session key by an escrow public key of said lawful interception dominion, where said escrow encryption is derived from ephemeral Diffie-Hellman key exchange. A necessary condition for said shared recovery of symmetric session key to take place is that sending or receiving endpoint device is a target endpoint device of lawful interception (i.e., either sending or receiving or both).

After $UE_A$ and $UE_B$ establish a common session key K by applying a cryptographic protocol for authenticated establishment of the symmetric session key K (preferably as schematized in FIG. 3), $UE_A$ sends to $UE_B$ encrypted user plane data as ciphertext CT=Enc_K(PT) for a given plaintext PT and $UE_B$ then decrypts CT as Dec_K(CT)=PT. According to the present invention, the assumption to enable shared escrow decryption of said escrow encrypted session key without recovering this key is that the escrow decryption function can be expressed in terms of a function that is homomorphic with respect to an escrow decryption private key. According to the system for lawful interception in Scenario 1 which is depicted in FIG. 1, $UE_A$ also computes and sends out, as attachment to CT, an escrow encrypted session key K'=Enc_PK(K), where PK is the escrow public key of LEA. K' together with CT is then intercepted and forwarded to LEA (as described in Scenario 1 depicted in FIG. 1), to be escrow decrypted via a cooperation with DEAs and then used to decrypt CT.

Prior to describing in more detail the solution shown in FIG. 4, some additional definitions and explanations will be provided. Let G denote a cyclic group of a large prime order p, let group operation be called multiplication, and let g denote a generator of this group. In particular, G and g can be the same (but not necessarily) as in authenticated session key establishment protocol depicted in FIG. 3. The escrow encryption public key is then defined as $PK=g^x$, where x is an escrow decryption private key from $\mathbb{Z}_p^*$. It is shown below that in the cryptographic protocol according to the present invention this key x is never generated or reconstructed in the process of shared escrow decryption of K', due to the homomorphic property of the exponential function $g^x$ with respect to x (i.e., $g^{x_1+x_2}=g^{x_1}g^{x_2}$). Here, the exponents are integers from $\mathbb{Z}_p$ and the addition of exponents is the addition of integers mod p. The homomorphic property means that the value of the exponential function of the (secret) sum of arguments $x_1+x_2$ can be obtained as the product of the (public) values of the exponential function of individual (secret) arguments $x_1$ and $x_2$, without having to know $x_1$, $x_2$, or $x_1+x_2$.

The Applicant notes that this homomorphic property holds for any cyclic group regardless of whether the additive or multiplicative terminology and notation are used. In additive notation, powers of a generator become integer multiples of a generator, which are called scalar multiples, and scalar multiplication replaces exponentiation, where scalars are integers from $\mathbb{Z}_p$ and their addition is mod p. In particular, additive terminology and notation are used for a cyclic subgroup of a large prime order of an elliptic curve group over a finite field, where elements of the group are points on an elliptic curve and the binary group operation is addition of these points. Such a group is important since the addition of elliptic curve points can be efficiently implemented on a battery-operated mobile endpoint device, whose computational power is constrained.

The escrow decryption private key SK=x is (effectively) split into n+1 shares according to a chosen (linear) secret sharing scheme. More precisely, $x=x_0+x'$, where $x_0$ is a random share of LEA and x' is a combined secret key shared among n DEAs according to a chosen (linear) secret sharing scheme. In a preferred embodiment said scheme is a (k, n) threshold scheme over $\mathbb{Z}_p$, with n parties and a threshold k, so that any number of parties equal to or bigger than k can recover the secret, while any number of parties smaller than k cannot obtain any information about the secret. Even more preferably, said (k, n) threshold scheme is implemented as the Shamir's secret sharing scheme, which is based on Lagrange's polynomial interpolation over a finite field. In this case, said finite field is $\mathbb{Z}_p$ with the operations of addition and multiplication of integers mod p. Secret sharing schemes different from the one by Shamir can be used, provided that they are linear, i.e., provided that the secret can be obtained by a linear function of the shares. Alternative secret sharing schemes could, e.g., allow more general access structures, i.e., subsets of participants being able of reconstructing the secret.

In the distributed (i.e., not centralized) setup phase of the preferred cryptographic protocol according to the present invention, the n+1 involved parties (n DEAs and LEA) generate and store their escrow decryption private key shares in a fully distributed, privacy preserving way, without involving a trusted dealer. In the simplest case where k=n, each party generates its own escrow decryption private key share by randomly choosing a number from $\mathbb{Z}_p^*$, namely, LEA thus generates $x_0$ and $DEA_i$ generates $x_i$, for each i=1, . . . , n. They also generate the corresponding (Diffie-Hellman) escrow encryption public key shares as $g^{x_0}$ and $g^{x_i}$, i=1, . . . , n, respectively. DEAs then send their respective escrow encryption public key shares to LEA, which reconstructs the escrow encryption public key, by using the homomorphic property of the exponential function, as $PK=g^x=g^{x_0}\prod_{i=1}^{n}g^{x_i}$. The corresponding escrow decryption private key, which is never generated or reconstructed in said protocol, is given as $SK=x=x_0+\sum_{i=1}^{n}x_i$. In the rare event when SK=0, i.e., PK=1, the process is repeated until PK≠1. This escrow encryption public key is then assumed to be trusted and made known to involved MNOs. The resulting scheme is equivalent to a (n+1, n+1) threshold scheme, since any subset of n or less parties does not get any information about x, because their contribution to x is perfectly masked by the sum of the remaining unknown shares. In particular, this relates to LEA itself or to all DEAs combined and hence satisfies access separation principle.

In a general case where k≤n, LEA randomly generates its key share $x_0$, while n DEAs randomly generate their key share by applying a distributed, privacy-preserving protocol for sharing a secret key x' among n parties according to a (k, n) threshold scheme, without involving a trusted dealer. In an example of said protocol, for any subset of k DEAs, each DEA from this subset randomly picks a separate secret key from $\mathbb{Z}_p^*$ computes shares of this key by using the Shamir's secret sharing scheme and then, as a trusted dealer, distributes these shares among the n recipient DEAs including itself over protected communication channels. Then each $DEA_i$ adds (mod p) all k received shares to obtain its share $x_i$, $i=1, \ldots, n$, while the equivalent secret key of the (k, n) threshold scheme is given as the sum of all k secret keys individually chosen by k DEAs from said subset. The corresponding (Diffie-Hellman) escrow encryption public key shares are then generated as $g^{x_0}$ and $g^{x_i}$, $i=1, \ldots, n$, respectively. The corresponding escrow decryption private key x', which is never generated or reconstructed in said protocol, can then be obtained from any subset of k escrow decryption private key shares corresponding to a set of k indexes $\mathcal{R}$, as $SK=x=x_0+\Sigma_{i\in\mathcal{R}} \lambda_i x_i$, where the coefficients $\lambda_i$ resulting from Lagrange's polynomial interpolation depend on $\mathcal{R}$, and $x'=\Sigma_{i\in\mathcal{R}} \lambda_i x_i$ is the equivalent secret key of the (k, n) threshold scheme (which is independent of $\mathcal{R}$ and is never generated or reconstructed in said protocol). DEAs then send their escrow encryption public key shares to LEA, which reconstructs the escrow encryption public key from any such set $\mathcal{R}$, by using the homomorphic property of the exponential function, as $PK=g^x=g^{x_0} \prod_{i\in\mathcal{R}} g^{x_i\lambda_i}$. The process is repeated until $PK\neq 1$. This escrow encryption public key is then assumed to be trusted and made known to involved MNOs. The resulting scheme is a linear secret sharing scheme in which neither LEA itself nor all DEAs combined can get any information about x.

In the preferred ephemeral Diffie-Hellman key exchange protocol over G, which is depicted in FIG. 4, a sending endpoint device $UE_A$ generates an escrow encrypted session key K' from session key K as $K'=g^r$, Inf, $\hat{K}$, which comprises a randomization part $R=g^r$, an information part Inf, and an encryption part $\hat{K}$ and sends it as an attachment to ciphertext CT to be used by LEA and DEAs for recovering K and then decrypting CT into PT.

More specifically, $UE_A$ first generates a (truly) random number r, $r\in\mathbb{Z}_p^*$, as an ephemeral Diffie-Hellman private key and computes the corresponding ephemeral Diffie-Hellman public key $g^r$ as a randomization part of K', which is needed for partial escrow decryption. $UE_A$ then computes $g^{rx}=(g^x)^r$ as the common key in Diffie-Hellman key exchange protocol and produces an information part of K' as Inf=A$\vee$B, LEA, TS, where A$^\vee$B (i.e., A, B, or both) is a non-empty ordered set $Target_{UE}$ of identities of target endpoint device(s) of lawful interception, LEA is an identity of LEA, and TS is a timestamp sent to $UE_A$ by $MNO_A^{visit}$. Both $g^{rx}$ and Inf are then used for computing an encryption part of K' as $\hat{K}=KDF(g^{rx}, Inf)\oplus K$, where KDF is a key derivation function and $\oplus$ is an encryption group operation (more generally, quasigroup operation) such as the bitwise XOR operation of binary strings. The information part Inf is used for verifying the authorization for lawful interception by DEAs, as described for Scenario 1 with reference to FIG. 1 and pointed out below.

In order to recover said session key K from the encryption part $\hat{K}$ of K' by shared escrow decryption, LEA sends a partial escrow decryption request $Req\_Dec_i$ to $DEA_i$ (where $i=1, \ldots, n$) comprising an authorization certificate Auth= (LIA, LEA, ID, T)$_{sign}$, signed by LIA, for one or two IDs (elements of $Target_{UE}$, i.e., ID=A or ID=B), and a request (LEA, $DEA_i$, $g^r$, Inf)$_{sign}$, signed by LEA, for each $DEA_i$ ($i=1, \ldots, n$).

Each $DEA_i$ verifies the signatures in (LIA, LEA, ID, T)$_{sign}$ and (LEA, $DEA_i$, $g^r$, Inf)$_{sign}$ as well as if ID belongs to $Target_{UE}$ from Inf and if TS from Inf belongs to T. If the verifications are all positive, then $DEA_i$ computes the requested partial escrow decryption result $(g^r)^{x_i}=g^{rx_i}$ by using $g^r$ and its escrow decryption private key share $x_i$ and sends back the obtained result to LEA. If not, then $DEA_i$ sends back a negative ACK to LEA. In the former case, LEA computes its own partial escrow decryption result $(g^r)^{x_0}=g^{rx_0}$ by using its own escrow decryption private key share $x_0$ and then combines it with the received partial escrow decryption results from the DEAs to recover said session key K from the encryption part $\hat{K}$ of K' as $K=KDF(g^{rx}, Inf)\oplus\hat{K}$, where $g^{rx}=g^{rx_0}\prod_{i\in\mathcal{R}} g^{rx_i\lambda_i}$ according to the homomorphic property of exponential function, or scalar multiplication function in additive notation. In a preferred embodiment for mobile applications, the underlying cyclic group G is implemented as a prime subgroup of an elliptic curve group over a finite field, with additive terminology and notation used. The escrow decryption function is thus computed in a distributed and fully private manner without ever using or reconstructing the escrow decryption private key SK. Finally, LEA then decrypts CT into PT.

The encryption part $\hat{K}$ of K' is needed for recovering K and, as such, is not sent to the DEAs. In a preferred embodiment of Scenario 1, in order to ensure accountability and minimize needed trust in LEA, randomization R and information Inf parts of K' are bound together by a digital signature of the sending endpoint device $UE_A$. More precisely, $g^r$, Inf is in a signed form ($g^r$, Inf)$_{sign}$, where the signature is computed by using a long-term private key of $UE_A$, possibly the same as in the cryptographic protocol for session key establishment explained above with reference to FIG. 3. In particular, the ElGamal signatures can be used for this purpose.

Without this binding, partial escrow decryption requests sent by LEA to DEAs can comprise a fake information part Inf along with the corresponding valid authorization certificate Auth, which can enable LEA to compute $g^{rx}$ for a genuine $g^r$ and hence perform unauthorized decryption of targeted ciphertext. This would require a collusion of LEA with $MNO_{LI}$ or $MNO_A^{visit}$ to send an illegitimate lawful interception request to $UE_A$ and hence prompt it to generate the corresponding escrow encrypted session key. To prevent such abuses, it is sufficient to verify this signature only in case of audits or disputes, when the transactions of DEAs securely stored in a database are subject to verifications. Namely, the possibility of detection serves as a deterrent of such abuses, without DEAs having to trust the long-term public keys of endpoint devices, for signature verification.

Cryptographic Protocol for Two Lawful Interception Dominions in Scenario 2

Figure 5A:
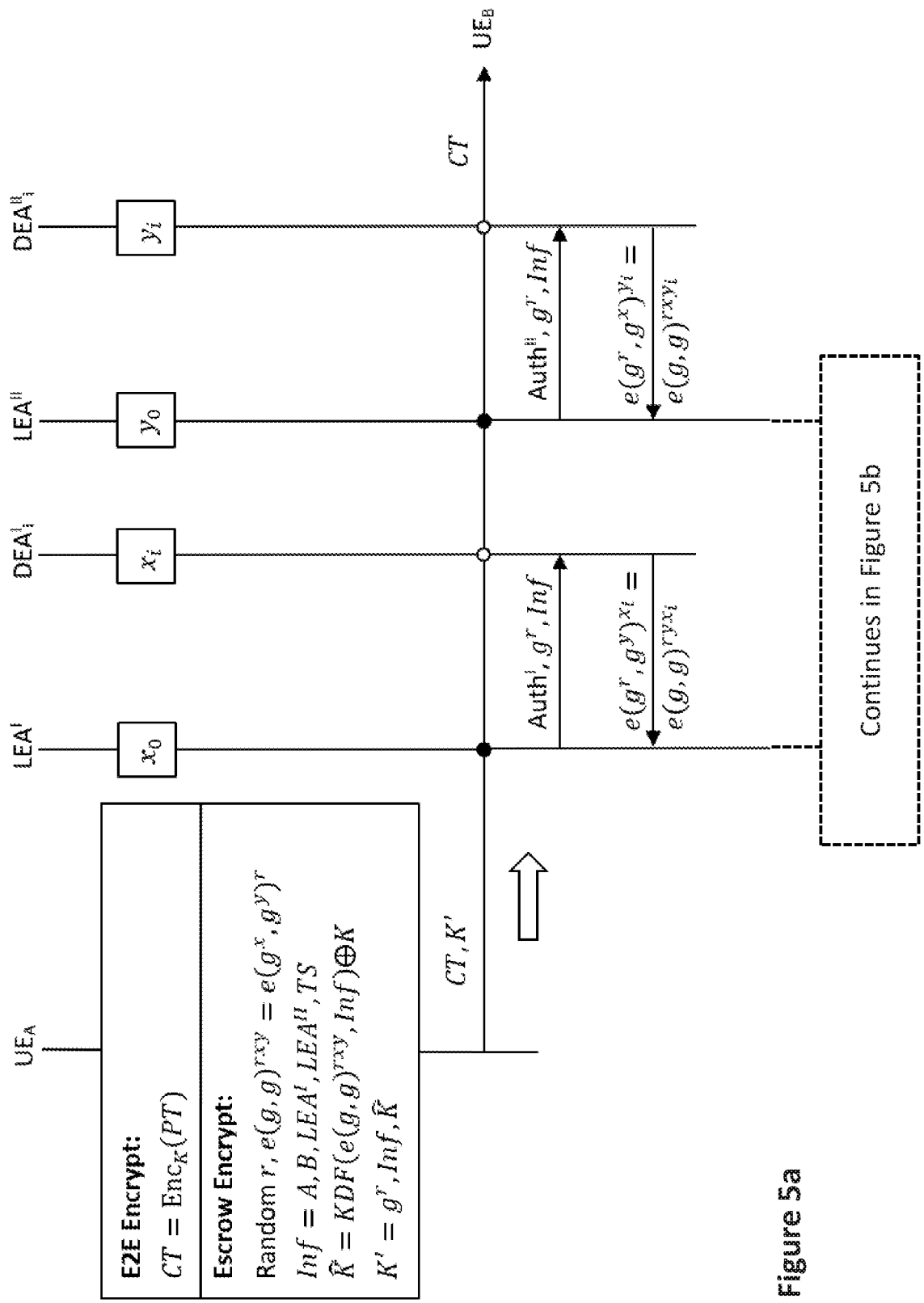
FIGS. 5a-5b show a diagram illustrating information exchanges related to the embodiment of FIG. 2.
Figure 5B:
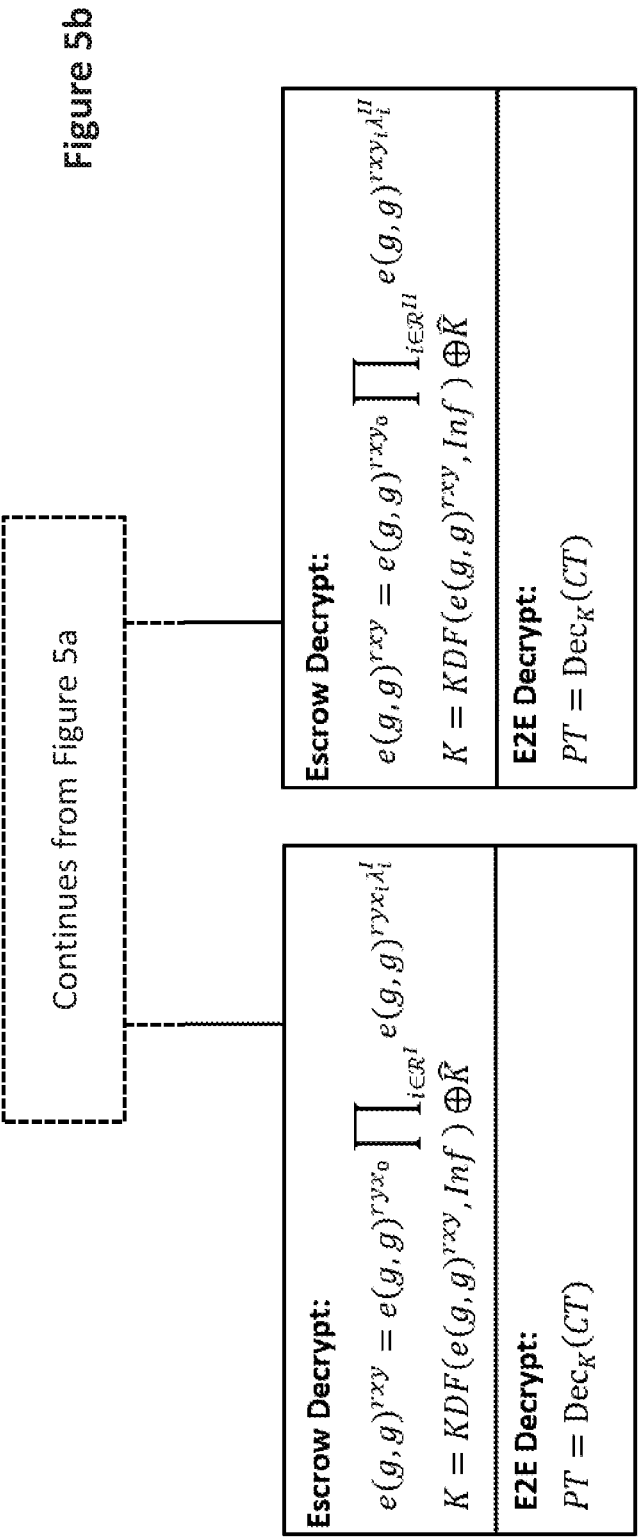

A preferred cryptographic protocol for shared recovery of symmetric session key for E2E encryption in Scenario 2 with two lawful interception dominions is depicted in FIGS. 5a-5b. This protocol is based on escrow encryption of said symmetric session key by two public keys of said two lawful interception dominions, respectively, where, in the preferred embodiment for the case in which sending and receiving endpoint devices are both target endpoint devices, said escrow encryption is derived from ephemeral tripartite Diffie-Hellman key exchange. It should be noted that for the case in which only sending endpoint device is a target endpoint device in dominion I or only receiving endpoint device is a target endpoint device in dominion II, a preferred cryptographic protocol is the one already explained with reference to FIG. 4 of Scenario 1.

Prior to describing in more detail the solution shown in FIGS. 5a-5b, some additional definitions and explanations will be provided. Let $G_1$, $G_2$, and $G_T$ (target group) denote cyclic groups of a large prime order p, e.g., with respect to multiplicative terminology and notation. In the symmetric case, $G_1=G_2=G$. A bilinear mapping (or pairing) is a map $e=G_1 \times G_2 \to G_T$ with the following properties: (1) bilinearity: $e(g_1, g_2)=e(g_1, g_2)^{ab}$, $g_1 \in G_1$, $g_2 \in G_2$, a, $b \in \mathbb{Z}_p$, (2) non-degeneracy: $e(g_1, g_2) \neq 1$, for any non-neutral elements (generators) $g_1 \in G_1$, $g_2 \in G_2$, and (3) computability: e is efficiently computable. In case $G_1$ and $G_2$ are prime subgroups of elliptic curve groups over finite fields, bilinear maps are called elliptic curve pairings and the used terminology and notation are additive. Bilinear mappings are important as they enable a one round protocol for tripartite Diffie-Hellman key exchange described, for example, in A. Joux, "A one round protocol for tripartite Diffie-Hellman," Journal of Cryptology, vol. 17, pp. 263-276, 2004). In this protocol, three parties, each with a Diffie-Hellman private/public key pair, can compute a common secret key by sending each other its public key in a single message. In particular, one party knowing the public keys of the other two parties, can establish the same common secret key with each of them by sending them its own public key, which can be randomly generated in the ephemeral setting. This, together with the underlying homomorphic property of the exponential function (in multiplicative notation) and secret sharing is the essence of the preferred cryptographic protocol which is explained below in more detail.

In the distributed (i.e., not centralized) setup phase of the preferred cryptographic protocol according to the present invention, the n+1 involved parties (n DEA's and $LEA^I$) in dominion I and m+1 involved parties (m $DEA^{II}$s and $LEA^{II}$) in dominion II generate and store their escrow decryption private key shares in a fully distributed, privacy preserving way, without involving a trusted dealer, in the way explained above with reference to FIG. 4 of Scenario 1. The escrow decryption private key shares correspond to an assumed linear secret sharing scheme over $\mathbb{Z}_p$, which in the preferred embodiment is a threshold secret sharing scheme. In the description given below it is for simplicity assumed that $G_1=G_2=G$ and that g is a generator of a group G, as in FIGS. 5a-5b. A generalization to asymmetric case where $G_1 \neq G_2$ is straightforward. Accordingly, in dominion I, $LEA^I$ and n $DEA^I$s randomly choose from $\mathbb{Z}_p^*$ the corresponding (Diffie-Hellman) escrow decryption private key shares $x_0$ and $x_i$, i=1, ..., n, and compute escrow encryption public key shares $g^{x_0}$ and $g^{x_i}$, i=1, ..., n, respectively, and $LEA^I$ then generates the escrow encryption public key as $PK^I = g^x = g^{x_0} \prod_{i \in \mathcal{R}^I} g^{x_i \lambda_i^I}$, with the corresponding escrow decryption private key $SK^I = x = x_0 + \Sigma_{i \in \mathcal{R}^I} \lambda_i^I x_i$, which is never generated or reconstructed in said protocol. Analogously, in dominion II, $LEA^{II}$ and m $DEA^{II}$s randomly choose from $\mathbb{Z}_p^*$ the corresponding (Diffie-Hellman) escrow decryption private key shares $y_0$ and $y_i$, i=1, ..., m, and compute escrow encryption public key shares $g^{y_0}$ and $g^{y_i}$, i=1, ..., m, respectively, ag $LEA^{II}$ then generates the escrow encryption public key as $PK^{II} = g^y = g^{y_0} \prod_{i \in \mathcal{R}^{II}} g^{y_i \lambda_i^{II}}$, with the corresponding escrow decryption private key $SK^{II} + y = y_0 + \Sigma_{i \in \mathcal{R}^{II}} \lambda_i^{II} x_i$, which is never generated or reconstructed in said protocol. The process is repeated until $PK^I$, $PK^{II} \neq 1$. The escrow encryption public keys $PK^I$ and $PK^{II}$ are assumed to be trusted and known to involved LEAs, DEAs, and MNOs.

In the preferred ephemeral tripartite Diffie-Hellman key exchange protocol over G, which is depicted in FIGS. 5a-5b, a sending endpoint device $UE_A$ generates an escrow encrypted session key K as $K' = g^r$, Inf, $\hat{K}$, which comprises a randomization part $R = g^r$, an information part Inf, and an encryption part $\hat{K}$ and sends it as an attachment to ciphertext CT to be used both by $LEA^I$ and n $DEA^I$s in dominion I and $LEA^{II}$ and m $DEA^{II}$s in dominion II for recovering K and then decrypting CT into PT.

More specifically, $UE_A$ first generates a (truly) random number r, $r \in \mathbb{Z}_p^*$, as an ephemeral tripartite Diffie-Hellman private key and computes the corresponding ephemeral Diffie-Hellman public key $g^r$ as a randomization part R of K', which is needed for partial escrow decryption. Due to bilinearity of the used bilinear mapping e, $UE_A$ then computes $e(g, g)^{rxy} = e(g^x, g^y)^r$ as the common key in tripartite Diffie-Hellman key exchange protocol and produces an information part of K' as $Inf = A, B, LEA^I, LEA^{II}, TS$ where A, B is an ordered set $Target_{UE} = A \vee B$ (i.e., both A and B) of identities of target endpoint devices of lawful interception, $LEA^I$, $LEA^{II}$ is an ordered set of identities of LEAs requesting lawful interception, and TS is a timestamp sent to $UE_A$ by $MNO_A^{visit}$. Both $e(g, g)^{rxy}$ and Inf are then used for computing an encryption part $\hat{K}$ of K' as $\hat{K} = KDF(e(g, g)^{rxy}, Inf) \oplus K$, where KDF is a key derivation function and $\oplus$ is an encryption group operation (more generally, quasigroup operation) such as the bitwise XOR operation of binary strings. The information part Inf is used for verifying the authorization for lawful interception by DEAs, in both dominions I and II, as described for Scenario 2 with reference to FIG. 2 and pointed out below.

In order to recover said session key K from the encryption part $\hat{K}$ of K' by shared escrow decryption, $LEA^I$ (resp. $LEA^{II}$) sends a partial escrow decryption request $Req\_Dec_i$ to $DEA^I_i$ (resp. $DEA^{II}_i$) comprising an authorization certificate $Auth^I = (LIA^I, LEA^I, ID^I, T^I)_{sign}$ for $ID^I = A$ (resp. $Auth^{II} = (LIA^{II}, LEA^{II}, ID^{II}, T^{II})_{sign}$ for $ID^{II} = B$), signed by $LIA^I$ (resp. $LIA^{II}$) and a request $(LEA^I, DEA^I_i, g^r, Inf)_{sign}$ (resp. $(LEA^{II}, DEA^{II}_i, g^r, Inf)_{sign}$), signed by $LEA^I$ (resp. $LEA^{II}$), for each i=1, ..., n (resp, i=1, ..., m).

$DEA^I_i$ (resp. $DEA^{II}_i$) verifies the signatures in $(LIA^I, LEA^I, ID^I, T^I)_{sign}$ and $(LEA^I, DEA^I_i, g^r, Inf)_{sign}$ (resp. $(LIA^{II}, LEA^{II}, ID^{II}, T^{II})_{sign}$ and $(LEA^{II}, DEA^{II}_i, g^r, Inf)_{sign}$) as well as if $ID^I = A$ (resp. $ID^{II} = B$), where $Target_{UE} = A \vee B$ from Inf, and if TS from Inf belongs to $T^I$ (resp. $T^{II}$). If the verifications are all positive, then, due to bilinearity, $DEA^I_i$ (resp. $DEA^{II}_i$) computes the requested partial escrow decryption result $e(g^r, g^y)^{x_i} = e(g, g)^{rxy x_i}$ (resp. $e(g^r, g^x)^{y_i} = e(g, g)^{rxy y_i}$) by using $g^r$ and its escrow decryption private key share $x_i$ (resp. $y_i$) and sends back the obtained result to $LEA^I$ (resp. $LEA^{II}$). If not, then $DEA^I_i$ (resp. $DEA^{II}_i$) sends back a negative ACK to $LEA^I$ (resp. $LEA^{II}$). In the former case, $LEA^I$ (resp. $LEA^{II}$) computes its own partial escrow decryption result $e(g, g)^{rxy x_0} = e(g^r, g^y)^{x_0}$ (resp. $e(g, g)^{rxy y_0} = e(g^r, g^x)^{y_0}$ by using its own escrow decryption private key share $x_0$ (resp. $y_0$) and then combines it with the received partial escrow decryption results from the DEA's (resp. $DEA^{II}$s) to recover said session key K from the encryption part $\hat{K}$ as $K = KDF(e(g, g)^{rxy}, Inf) \oplus \hat{K}$, where $e(g, g)^{rxy} = e(g, g)^{rxy x_0} \prod_{i \in \mathcal{R}^I} e(g, g)^{rxy x_i \lambda_i^I}$ (resp. $e(g, g)^{rxy} = e(g, g)^{rxy y_0} \prod_{i \in \mathcal{R}^{II}} e(g, g)^{rxy y_i \lambda_i^{II}}$) according to the homomorphic property of exponential function, or scalar multiplication function in additive notation. In a preferred embodiment for mobile applications, the underlying cyclic group G is implemented as a prime subgroup of an elliptic curve group over a finite field, with additive terminology and notation used. The escrow decryption function is thus computed in a distributed and fully private manner without ever using or reconstructing the escrow private key $SK^I$ in dominion I (resp. $SK^{II}$ in dominion II). Finally, $LEA^I$ (resp. $LEA^{II}$) then decrypts CT into PT.

In an alternative embodiment, instead of computing the encryption part of escrow encrypted session key by simultaneously using said two escrow encryption public keys of said two lawful interception dominions via ephemeral tripartite Diffie-Hellman key exchange protocol, it is possible to individually compute and send two escrow encryptions of the same session key by using said two escrow encryption public keys via ephemeral bipartite Diffie-Hellman key exchange protocol individually, as described with reference to FIG. 4 instead of FIGS. 5a-5b.

In a preferred embodiment of Scenario 2, like in Scenario 1, in order to ensure accountability and minimize needed trust in $LEA^I$ and $LEA^{II}$, randomization R and information Inf parts of K' are bound together by a digital signature of the sending endpoint device $UE_A$ as $(g^r, Inf)_{sign}$. This way, it is possible to detect eventual fake partial escrow decryption requests by $LEA^I$ or $LEA^{II}$ in which a genuine $g^r$ without a valid authorization for lawful interception is combined with a fake Inf along with a valid authorization for lawful interception in order to fool DEAs and thus enable $LEA^I$ or $LEA^{II}$ to compute genuine $e(g, g)^{rxy}$ and hence perform unauthorized decryption of targeted ciphertext. The possibility of detecting such abuses serves as a deterrent which reduces needed trust in LEAs.

Secure Implementation

The present invention can be implemented in a way that ensures the properties of security and accountability. The security of the involved cryptographic protocols and algorithms is based on standard computational assumptions.

For example, in a preferred embodiment of the present invention, authenticated session key establishment can be based on a securely designed and implemented ephemeral Diffie-Hellman key exchange protocol. Further, in a preferred embodiment of the present invention, shared recovery of session key for E2E encryption in the case of a single lawful interception dominion can be based on escrow encryption of the session key by the public key of said lawful interception dominion according to a securely designed and implemented ephemeral bipartite Diffie-Hellman key exchange protocol and by applying a secure key derivation function to appropriately assembled escrow encrypted session key.

In a preferred embodiment of the present invention, shared recovery of session key for E2E encryption in the case of two lawful interception dominions can be based on escrow encryption of the session key by simultaneously using two public keys of said two lawful interception dominions according to a securely designed and implemented ephemeral tripartite Diffie-Hellman key exchange protocol.

One of the measures of ensuring accountability of internal entities of the lawful interception system according to the present invention is to maintain audit logs of chronological records relating to all authorizations of lawful interception requests digitally signed by LIAs, as authorization certificates, and partial escrow decryption requests digitally signed by LEAs. Said audit logs should be stored in integrity-protected databases, centralized or distributed, with traceable administrator interventions and controlled access to data records. In preferred embodiments, audit logs can be stored by using distributed ledger technology or blockchain technology. Organizationally, access to audit logs and eventual verification of stored records can be supported by dispute resolution authorities. The possibility of detecting abuses by auditing said databases, along with adequate regulatory or legislation support, serve as a deterrent of internal attacks.

Further, in order to ensure secure implementation, in a preferred embodiment of the present invention, DEAs should securely store each private piece of escrow decryption information in a tamper-resistant hardware security module and perform all the computations on it in said module. This will prevent a malicious external or internal attack aiming at extracting said private pieces of escrow decryption information. As well, said private pieces of escrow decryption information should preferably be refreshed periodically.

To satisfy the mobility requirement for lawful interception, escrow encryption keys and the corresponding private pieces of escrow decryption information are assumed to depend only on the lawful interception dominion and not on the sending or receiving endpoint device. This would incentivize DEAs to apply strict security measures, because a selective user-specific unauthorized key disclosure would not then be possible.

In a preferred embodiment of the present invention, in order to minimize the risk of a collusion attack involving all DEAs and LEA, along with the related MNOs, attempting to perform unauthorized decryption of targeted ciphertexts in a given lawful interception dominion, DEAs and LEA should be mutually administratively and technologically independent. The Applicant notes that, due to the property of decryption escrow, such a hypothetical attack would require all of said entities to cooperate for each ciphertext.

In a preferred embodiment of the present invention, the communication channels between LIAs, LEAs, DEAs, and MNOs should be protected in terms of authentication, confidentiality, integrity, and anti-replay of transmitted messages. Command activation requests should be sent to the sending endpoint device over-the-air over a protected control plane and, in their absence, dummy command activation requests should be sent. In case of malfunctioning or misbehavior of a subset of entities in the system, the other entities can detect such an anomaly and take appropriate actions. To minimize the risk of malicious implementations of endpoint devices, escrow encryption computations should preferably be run on tamper-resistant secure hardware elements such as a subscription SIM card.

Yet another advantage of the system and method according to the present invention is that private pieces of information, such as private keys and private key shares are generated locally and are never exposed. This privacy property relates to DEAs, and LEAs, as well as users with endpoint devices. Consequently, unlike the existing prior art solutions, no trusted third party is required for generating escrow encryption keys and escrow decryption shares.

In summary, the system and method according to the present invention have the advantageous properties of decryption escrow, mobility, minimal trust, privacy, bidirectional data traffic access, and forward & backward secrecy, along with more common properties of shared recovery, independence, access separation, accountability, security, and simplicity.

The invention claimed is:

1. Method for decryption of end-to-end encrypted messages, wherein said messages are encrypted through user plane data encryption, said method comprising:

providing at least a first main computer system ($LEA^I$) and one or more first auxiliary computer systems ($DEA^I1 \ldots DEA^In$);

generating and storing, at the first main computer system ($LEA^I$) and each first auxiliary computer system ($DEA^I1 \ldots DEA^In$), a respective random number x0', x1' ... xn', wherein each said respective random number is a share in a linear secret sharing scheme, wherein the secret is x', wherein said secret x' can be obtained from x0' and an arbitrary subset of k' out of n of said respective random numbers (x1' ... xn'), wherein k' is equal to or larger than 2 and equal to or smaller than n, wherein the secret x' is not calculated;

generating and storing, at the first main computer system ($LEA^I$) and each of said first auxiliary computer systems ($DEA^I1 \ldots DEA^In$), a respective first escrow encryption public key share, on the basis of the respective random number;

sending, from each first auxiliary computer system ($DEA^I1 \ldots DEA^In$) to the first main computer system ($LEA^I$), the respective first escrow encryption public key share;

calculating, at the first main computer system ($LEA^I$), a first escrow encryption public key by combining the first escrow encryption public key share of the first main computer system ($LEA^I$) with the first escrow encryption public key shares of the first auxiliary computer systems, wherein x' is a first escrow decryption private key for decrypting strings which have been encrypted with said first escrow encryption public key;

determining, by a telecommunications network (TLC), that a first user equipment ($UE_A$) is to send user plane data to a second user equipment ($UE_B$);

determining, by a cooperation of the first main computer system ($LEA^I$) and said telecommunications network (TLC), if said first user equipment ($UE_A$) and/or said second user equipment ($UE_B$) is a target of lawful interception associated with the first main computer system ($LEA^I$);

when user plane data are to be sent from said first user equipment ($UE_A$) to said second user equipment ($UE_B$) and said first user equipment ($UE_A$) and/or said second user equipment ($UE_B$) is a target of lawful interception, configuring said first user equipment ($UE_A$) to generate:

an end-to-end encrypted message (CT) obtained by encrypting, with a session key (K), a plain message (PT) formed by said user plane data, wherein said end-to-end encrypted message (CT) is intended for said second user equipment ($UE_B$), to be decrypted by using the session key (K);

an attachment (K') to be associated to said end-to-end encrypted message (CT), wherein said attachment (K') includes at least an escrow encrypted key (K̂), obtained by encrypting said session key (K) using an escrow encryption function and said first escrow encryption public key, wherein an escrow decryption function corresponding to said escrow encryption function is homomorphic with respect to said first escrow decryption private key x';

receiving from the first user equipment ($UE_A$), at the first main computer system ($LEA^I$) through said communications network (TLC), said end-to-end encrypted message (CT) and said attachment (K');

forwarding via said communications network (TLC) said end-to-end encrypted message (CT) to said second user equipment ($UE_B$), without said attachment (K');

sending from the first main computer system ($LEA^I$) to each first auxiliary computer system ($DEA^I1 \ldots DEA^In$) a partial escrow decryption request (Req_Dec);

receiving at the first main computer system ($LEA^I$), from each first auxiliary computer system ($DEA^I1 \ldots DEA^In$), a partial escrow decryption response (Dec) calculated on the basis of the respective random number xi' and calculating a partial escrow decryption result of said first main computer system ($LEA^I$) on the basis of the random number x0';

decrypting said escrow encrypted key (K̂) at the first main computer system ($LEA^I$) using the partial escrow decryption responses (Dec) from a subset of k' out of n first auxiliary computer systems ($DEA^I1 \ldots DEA^In$) and the partial escrow decryption result of said first main computer system ($LEA^I$), thereby obtaining the session key (K) in a shared way;

decrypting said end-to-end encrypted message (CT) using said session key (K), thereby obtaining said plain message (PT) at the first main computer system ($LEA^I$).

2. Method according to claim 1, further comprising:

providing a second main computer system ($LEA^{II}$) and one or more second auxiliary computer systems ($DEA^{II}1 \ldots DEA^{II}m$) associated to said second main computer system ($LEA^{II}$);

generating and storing, at the second main computer system ($LEA^{II}$) and each second auxiliary computer system ($DEA^{II}1 \ldots DEA^{II}m$), a respective random number x0", x1" ... xm", wherein each said respective random number is a share in a linear secret sharing scheme, wherein the secret is x", wherein said secret x" can be obtained from x0" and an arbitrary subset of k" of m said respective random numbers (x1" ... xm"), wherein k" is equal to or larger than 2 and equal to or smaller than m, wherein the secret x" is not calculated;

generating and storing, at the second main computer system ($LEA^{II}$) and each of said second auxiliary computer systems ($DEA^{II}1 \ldots DEA^{II}m$), a respective second escrow encryption public key share, on the basis of the respective random number;

sending, from each second auxiliary computer system ($DEA^{II}1 \ldots DEA^{II}m$) to the second main computer system ($LEA^{II}$) the respective second escrow encryption public key share;

calculating, at the second main computer system ($LEA^{II}$), a second escrow encryption public key by combining the second escrow encryption public key share of the second main computer system ($LEA^{II}$) with the second escrow encryption public key shares of the second auxiliary computer systems, wherein x" is a second escrow decryption private key for decrypting strings which have been encrypted with said second escrow encryption public key;

wherein lawful interception of said first user equipment ($UE_A$) is associated with said first main computer system ($LEA^I$) and lawful interception of said second user equipment ($UE_B$) is associated with said second main computer system ($LEA^{II}$);

wherein, by a cooperation of the second main computer system ($LEA^{II}$) and said telecommunications network (TLC), it is determined if said second user equipment ($UE_B$) is a target of lawful interception associated with the second main computer system ($LEA^{II}$);

wherein, if the first user equipment ($UE_A$) is a target of lawful interception associated with the first main computer system ($LEA^I$) and the second user equipment ($UE_B$) is not a target of lawful interception:
- said first user equipment ($UE_A$) is configured to generate the escrow encrypted key ($\hat{K}$) by encrypting said session key (K) using an escrow encryption function and said first escrow encryption public key, wherein an escrow decryption function corresponding to said escrow encryption function is homomorphic with respect to the first escrow decryption private key x';
- said escrow encrypted key ($\hat{K}$) is decrypted at the first main computer system ($LEA^I$), using partial escrow decryption responses from the first auxiliary computer systems and partial escrow decryption result from the main computer system ($LEA^I$), thereby obtaining the session key (K) in a shared way;
- said end-to-end encrypted message (CT) is decrypted at the first main computer system ($LEA^I$), using said session key (K), thereby obtaining said plain message (PT);

wherein, if the second user equipment ($UE_B$) is a target for lawful interception associated with the second main computer system ($LEA^{II}$) and the first user equipment ($UE_A$) is not a target of lawful interception:
- said first user equipment ($UE_A$) is configured to generate the escrow encrypted key ($\hat{K}$) by encrypting said session key (K) using an escrow encryption function and said second escrow encryption public key, wherein an escrow decryption function corresponding to said escrow encryption function is homomorphic with respect to the second escrow decryption private key x";
- a partial escrow decryption request is sent from said second main computer system ($LEA^{II}$) to each second auxiliary computer system ($DEA^{II}1 \ldots DEA^{II}m$);
- from each second auxiliary computer system ($DEA^{II}1 \ldots DEA^{II}m$), a partial escrow decryption response is sent to the second main computer system ($LEA^{II}$), said escrow decryption response being calculated on the basis of the respective random number xi", and a partial escrow decryption result of said second main computer system ($LEA^{II}$) is calculated on the basis of the random number x0";
- at the second main computer system ($LEA^{II}$), said escrow encrypted key ($\hat{K}$) is decrypted using the partial escrow decryption responses from a subset of k" out of m second auxiliary computer systems ($DEA^{II}1 \ldots DEA^{II}m$) and the partial escrow decryption result of said second main computer system ($LEA^{II}$), thereby obtaining the session key (K) in a shared way;
- said end-to-end encrypted message (CT) is decrypted at the second main computer system ($LEA^I$), using said session key (K), thereby obtaining said plain message (PT);

wherein, if the first user equipment ($UE_A$) is a target of lawful interception associated with the first main computer system ($LEA^I$) and the second user equipment ($UE_B$) is a target of lawful interception associated with the second main computer system ($LEA^{II}$):
- said first user equipment ($UE_A$) is configured to generate the escrow encrypted key ($\hat{K}$) by encrypting said session key (K) using an escrow encryption function and said first and second escrow encryption public keys, wherein an escrow decryption function corresponding to said escrow encryption function is homomorphic with respect to the first escrow decryption private key x' and is homomorphic with respect to the second escrow decryption private key x";
- said escrow encrypted key ($\hat{K}$) is decrypted at the first main computer system ($LEA^I$), using the corresponding partial escrow decryption responses from the first auxiliary computer systems and the partial escrow decryption result of said first main computer system ($LEA^I$), thereby obtaining the session key (K) in a shared way;
- said escrow encrypted key ($\hat{K}$) is decrypted at the second main computer system ($LEA^{II}$), using the corresponding partial escrow decryption responses from the second auxiliary computer systems and the partial escrow decryption result of said second main computer system ($LEA^{II}$), thereby obtaining the session key (K) in a shared way;
- said end-to-end encrypted message (CT) is decrypted at both the first main computer system ($LEA^I$) and the second main computer system ($LEA^{II}$), using said session key (K), thereby obtaining said plain message (PT).

3. Method according to claim 1, wherein said session key (K) is a symmetric key established in common by said first and second user equipment ($UE_A$, $UE_B$) by applying a cryptographic protocol for authenticated key establishment.

4. Method according to claim 3, wherein said cryptographic protocol is an ephemeral Diffie-Hellman, DH, key exchange protocol based on long-term DH private/public key pairs locally generated and stored securely in each of said first and second user equipment ($UE_A$, $UE_B$).

5. Method according to claim 4, wherein said cryptographic protocol comprises:
- generation of a random ephemeral DH private/public key pair of the first user equipment ($UE_A$);
- computation of ephemeral DH common key from said ephemeral DH private/public key pair and said long-term DH private/public key pair of said second user equipment ($UE_B$);
- application of a key derivation function (KDF) to said ephemeral DH common key to obtain said session key (K), to be used for symmetric-key encryption of user plane data in the session.

6. Method according to claim 1, wherein the attachment (K') also includes an information part (Inf), said information part including:
- a first indication identifying said first and/or second user equipment ($UE_A$, $UE_B$) as a target of lawful interception;
- a second indication identifying said first and/or second main computer system ($LEA^I$, $LEA^{II}$);
- a timestamp (TS).

7. Method according to claim 6, wherein said escrow encryption of session key (K) is derived by adapting ephemeral DH key exchange protocol, the escrow encryption of session key (K) comprising:
- generation of a random ephemeral DH private/public key pair of said first user equipment ($UE_A$);
- computation of ephemeral DH common key from said ephemeral DH private key of said first user equipment ($UE_A$) and DH first escrow public key PK of said first main computer system ($LEA^I$) according to standard DH key exchange protocol;

generating the information part (Inf) of escrow encrypted session key by concatenating identities of said first and/or second user equipment ($UE_A$, $UE_B$) as targets of lawful interception, identity of said first main computer system ($LEA^I$), and said timestamp (TS);

applying a key derivation function (KDF) to the concatenation of said ephemeral DH common key and said information part (Inf), and then reversibly combining the result with the session key to obtain encryption part of said escrow encrypted session key;

assembling said escrow encrypted session key by concatenating said ephemeral DH public key, said information part (Inf), and said encryption part;

wherein said shared escrow decryption of said escrow encrypted session key is based on the homomorphic property of the exponential function in the underlying DH cyclic group with multiplicative notation, with respect to (modular) addition of exponents.

8. Method according to claim 6, wherein each of said first and second main computer system ($LEA^I$, $LEA^{II}$) is associated with a respective DH escrow public key $PK^I$ or $PK^{II}$, each corresponding to said first or second user equipment ($UE_A$, $UE_B$), respectively, wherein said escrow encryption of session key is derived by adapting ephemeral tripartite DH key exchange protocol, the escrow encryption of session key comprising:

generation of a random ephemeral DH private/public key pair of said first user equipment ($UE_A$);

computation of ephemeral tripartite DH common key from said ephemeral DH private key of said first user equipment ($UE_A$) and said DH escrow public keys $PK^I$ and $PK^{II}$ of said first and second main computer systems ($LEA^I$, $LEA^{II}$), respectively, according to tripartite DH key exchange protocol using a bilinear mapping over underlying DH cyclic groups;

generating the information part (Inf) of escrow encrypted session key by concatenating identities of said first and second user equipment ($UE_A$, $UE_B$) as targets of lawful interception, identities of said first and second main computer systems ($LEA^I$, $LEA^{II}$), and said timestamp (TS);

applying a key derivation function (KDF) to the concatenation of said ephemeral tripartite DH common key and said information part (Inf), and then reversibly combining the result with the session key to obtain encryption part of said escrow encrypted session key;

assembling escrow encrypted session key by concatenating said ephemeral DH public key, said information part (Inf), and said encryption part;

wherein said shared escrow decryption of said escrow encrypted session key is based on the homomorphic property of the exponential function resulting from said bilinear mapping in the underlying DH cyclic group with multiplicative notation, with respect to (modular) addition of exponents.

9. Method according to claim 1, wherein said first and/or second main computer system ($LEA^I$, $LEA^{II}$), before said first user equipment ($UE_A$) is configured to generate said attachment (K'):

sends an authorization request to a respective authoritative computer system ($LIA^I$, $LIA^{II}$);

receives an authorization response from said respective authoritative computer system ($LIA^I$, $LIA^{II}$), in a form of appropriate lawful interception authorization certificate.

10. Method according to claim 1, wherein said first and/or second main computer system ($LEA^I$, $LEA^{II}$) corresponds to the respective actual location of said first and/or second user equipment ($UE_A$, $UE_B$) in a mobile communication network, wherein, if said location changes during the same session, then in the handover process, said first and/or second main computer system ($LEA^I$, $LEA^{II}$) and its respective escrow encryption public key are changed and the escrow encryption of the session key at the first user equipment ($UE_A$) is updated according to the changed first and/or second escrow encryption public keys.

11. Method according to claim 1, wherein said linear secret sharing scheme is such that said first and/or second main computer system ($LEA^I$, $LEA^{II}$) cannot obtain any information about the session key without said first and/or second auxiliary computer systems ($DEA^I1 \ldots DEA^In$, $DEA^{II}1 \ldots DEA^{II}m$), respectively, and that said first and/or second auxiliary computer systems ($DEA^I1 \ldots DEA^In$, $DEA^{II}1 \ldots DEA^{II}m$) cannot themselves obtain any information about the session key, respectively.

12. System for decryption of end-to-end encrypted messages, wherein said messages are encrypted through user plane data encryption, said system comprising at least a first main computer system ($LEA^I$) and one or more first auxiliary computer systems ($DEA^I1 \ldots DEA^In$);

wherein the first main computer system ($LEA^I$) and each first auxiliary computer system ($DEA^I1 \ldots DEA^In$) is configured to generate and store a respective random number $x0'$, $x1' \ldots xn'$, wherein each said respective random number is a share in a linear secret sharing scheme, wherein the secret is $x'$, wherein said secret $x'$ can be obtained from $x0'$ and an arbitrary subset of $k'$ out of n said respective random numbers ($x1' \ldots xn'$), wherein $k'$ is equal to or larger than 2 and equal to or smaller than n, wherein the secret $x'$ is not calculated;

wherein the first main computer system ($LEA^I$) and each of said first auxiliary computer systems ($DEA^I1 \ldots DEA^In$) is configured to generate and store a respective first escrow encryption public key share, on the basis of the respective random number;

wherein each first auxiliary computer system ($DEA^I1 \ldots DEA^In$) is configured to send to the first main computer system ($LEA^I$) the respective first escrow encryption public key share;

wherein the first main computer system ($LEA^I$) is configured to calculate a first escrow encryption public key by combining the first escrow encryption public key share of the first main computer system ($LEA^I$) with the first escrow encryption public key shares of the first auxiliary computer systems, wherein $x'$ is a first escrow decryption private key for decrypting strings which have been encrypted with said first escrow encryption public key;

wherein a telecommunications network (TLC) is configured to determine that a first user equipment ($UE_A$) is to send user plane data to a second user equipment ($UE_B$);

wherein the first main computer system ($LEA^I$) and said telecommunications network (TLC) cooperate to determine if said first user equipment ($UE_A$) and/or said second user equipment ($UE_B$) is a target of lawful interception associated with the first main computer system ($LEA^I$);

wherein, when user plane data are to be sent from said first user equipment ($UE_A$) to said second user equipment ($UE_B$) and said first user equipment ($UE_A$) and/or said second user equipment ($UE_B$) is a target of lawful interception, said first user equipment ($UE_A$) is configured to generate:

an end-to-end encrypted message (CT) obtained by encrypting, with a session key (K), a plain message (PT) formed by said user plane data, wherein said end-to-end encrypted message (CT) is intended for said second user equipment ($UE_B$), to be decrypted by using the same session key (K);

an attachment (K') to be associated to said end-to-end encrypted message (CT), wherein said attachment (K') includes at least an escrow encrypted key ($\hat{K}$), obtained by encrypting said session key (K) using an escrow encryption function and said first escrow encryption public key, wherein an escrow decryption function corresponding to said escrow encryption function is homomorphic with respect to said first escrow decryption private key x';

wherein, the first main computer system ($LEA^I$) receives from the first user equipment ($UE_A$) through said communications network (TLC), said end-to-end encrypted message (CT) and said attachment (K'), said end-to-end encrypted message (CT) being forwarded to said second user equipment ($UE_B$), without said attachment (K');

wherein the first main computer system ($LEA^I$) sends to each first auxiliary computer system ($DEA^I1 \ldots DEA^In$) a partial escrow decryption request (Req_Dec);

wherein, from each first auxiliary computer system ($DEA^I1 \ldots DEA^In$), the first main computer system ($LEA^I$) receives a partial escrow decryption response (Dec), calculated on the basis of the respective random number xi', and calculates a partial escrow decryption result of said first main computer system ($LEA^I$) on the basis of the random number x0';

wherein the first main computer system ($LEA^I$) decrypts said escrow encrypted key ($\hat{K}$) using the partial escrow decryption responses (Dec) from a subset of k' out of n first auxiliary computer systems ($DEA^I1 \ldots DEA^In$) and the partial escrow decryption result of said first main computer system ($LEA^I$), thereby obtaining the session key (K) in a shared way;

wherein the first main computer system ($LEA^I$) decrypts said end-to-end encrypted message (CT) using said session key (K), thereby obtaining said plain message (PT).

13. System according to claim 12, further comprising a second main computer system ($LEA^{II}$) and one or more second auxiliary computer systems ($DEA^{II}1 \ldots DEA^{II}m$) associated to said second main computer system ($LEA^{II}$);

wherein the second main computer system ($LEA^{II}$) and each second auxiliary computer system ($DEA^{II}1 \ldots DEA^{II}m$) is configured to generate and store a respective random number x0", x1" ... xm", wherein each said respective random number is a share in a linear secret sharing scheme, wherein the secret is x", wherein said secret x" can be obtained from x0" and an arbitrary subset of k" of m said respective random numbers (x1" ... xm"), wherein k" is equal to or larger than 2 and equal to or smaller than m, wherein the secret x" is not calculated;

wherein the second main computer system ($LEA^{II}$) and each of said second auxiliary computer systems ($DEA^{II}1 \ldots DEA^{II}m$) is configured to generate and store a respective second escrow encryption public key share, based on the respective random number;

wherein each second auxiliary computer system ($DEA^{II}1 \ldots DEA^{II}m$) is configured to send to the second main computer system ($LEA^{II}$) the respective second escrow encryption public key share;

wherein the second main computer system ($LEA^{II}$) is configured to calculate a second escrow encryption public key by combining the second escrow encryption public key share of the second main computer system ($LEA^{II}$) with the second escrow encryption public key shares of the second auxiliary computer systems, wherein x" is a second escrow decryption private key for decrypting strings which have been encrypted with said second escrow encryption public key;

wherein lawful interception of said first user equipment ($UE_A$) is associated with said first main computer system ($LEA^I$) and lawful interception of said second user equipment ($UE_B$) is associated with said second main computer system ($LEA^{II}$);

wherein, if the first user equipment ($UE_A$) is a target of lawful interception associated with the first main computer system ($LEA^I$) and the second user equipment ($UE_B$) is not a target of lawful interception:

the escrow encrypted key ($\hat{K}$) is obtained by encrypting said session key (K) using an escrow encryption function and said first escrow encryption public key, wherein an escrow decryption function corresponding to said escrow encryption function is homomorphic with respect to the first escrow decryption private key x';

said escrow encrypted key ($\hat{K}$) is decrypted at the first main computer system ($LEA^I$), using partial escrow decryption responses from first auxiliary computer systems and partial escrow decryption result of the first main computer system ($LEA^I$), thereby obtaining the session key (K) in a shared way;

said end-to-end encrypted message (CT) is decrypted at the first main computer system ($LEA^I$), using said session key (K), thereby obtaining said plain message (PT);

wherein, if the second user equipment ($UE_B$) is a target for lawful interception associated with the second main computer system ($LEA^{II}$) and the first user equipment ($UE_A$) is not a target of lawful interception:

the escrow encrypted key ($\hat{K}$) is obtained by encrypting said session key (K) using an escrow encryption function and said second escrow encryption public key, wherein an escrow decryption function corresponding to said escrow encryption function is homomorphic with respect to the second escrow decryption private key x";

a partial escrow decryption request is sent from said second main computer system ($LEA^{II}$) to each second auxiliary computer system ($DEA^{II}1 \ldots DEA^{II}m$);

from each second auxiliary computer system ($DEA^{II}1 \ldots DEA^{II}m$), a partial escrow decryption response is sent to the second main computer system ($LEA^{II}$), said escrow decryption response being calculated on the basis of the respective random number xi", and a partial escrow decryption result of said second main computer system ($LEA^{II}$) is calculated on the basis of the random number x0";

at the second main computer system ($LEA^{II}$), said escrow encrypted key ($\hat{K}$) is decrypted using the escrow decryption responses from a subset of k" out of m second auxiliary computer systems ($DEA^{II}1 \ldots DEA^{II}m$) and the partial escrow decryption result of said second main computer system ($LEA^{II}$), thereby obtaining the session key (K) in a shared way;

said end-to-end encrypted message (CT) is decrypted at the second main computer system (LEA$^{II}$), using said session key (K), thereby obtaining said plain message (PT);

wherein, if the first user equipment (UE$_A$) is a target of lawful interception associated with the first main computer system (LEA$^{I}$) and the second user equipment (UE$_B$) is a target of lawful interception associated with the second main computer system (LEA$^{II}$):

the escrow encrypted key ($\hat{K}$) is obtained by encrypting said session key (K) using an escrow encryption function and said first and second escrow encryption public keys, wherein an escrow decryption function corresponding to said escrow encryption function is homomorphic with respect to the first escrow decryption private key x' and is homomorphic with respect to the second escrow decryption private key x";

said escrow encrypted key ($\hat{K}$) is decrypted at the first main computer system (LEA$^{I}$), using the corresponding partial escrow decryption responses from the first auxiliary computer systems and the partial escrow decryption result of said first main computer system (LEA$^{I}$), thereby obtaining the session key (K) in a shared way;

said escrow encrypted key ($\hat{K}$) is decrypted at the second main computer system (LEA$^{II}$), using the corresponding partial escrow decryption responses from the second auxiliary computer systems and the partial escrow decryption result of said second main computer system (LEA$^{II}$), thereby obtaining the session key (K) in a shared way;

said end-to-end encrypted message (CT) is decrypted at both the first main computer system (LEA$^{I}$) and the second main computer system (LEA$^{II}$), using said session key (K), thereby obtaining said plain message (PT).

14. System according to claim 12, wherein said communications network (TLC) is a mobile communication network, which can support said additional functional requirements, wherein said first user equipment (UE$_A$) and said second user equipment (UE$_B$) are implemented as mobile communication devices.

* * * * *